(12) United States Patent
Qi et al.

(10) Patent No.: US 12,018,548 B2
(45) Date of Patent: Jun. 25, 2024

(54) DOWNHOLE TRACTOR CONTROL SYSTEMS AND METHODS TO ADJUST A LOAD OF A DOWNHOLE MOTOR

(71) Applicant: Halliburton Energy Services, Inc., Houston, TX (US)

(72) Inventors: Yuan Qi, Houston, TX (US); Sudhir Kumar Gupta, Kingwood, TX (US)

(73) Assignee: HALLIBURTON ENERGY SERVICES, INC, Houston, TX (US)

(*) Notice: Subject to any disclaimer, the term of this patent is extended or adjusted under 35 U.S.C. 154(b) by 0 days.

(21) Appl. No.: 17/964,541

(22) Filed: Oct. 12, 2022

(65) Prior Publication Data
US 2023/0058152 A1 Feb. 23, 2023

Related U.S. Application Data

(63) Continuation of application No. 16/666,169, filed on Oct. 28, 2019, now Pat. No. 11,499,372.

(51) Int. Cl.
| | |
|---|---|
| *E21B 4/16* | (2006.01) |
| *E21B 4/18* | (2006.01) |
| *E21B 23/14* | (2006.01) |
| *H02P 5/46* | (2006.01) |

(52) U.S. Cl.
CPC ............ *E21B 4/16* (2013.01); *E21B 4/18* (2013.01); *E21B 23/14* (2013.01); *H02P 5/46* (2013.01)

(58) Field of Classification Search
CPC ... E21B 4/16; E21B 4/18; E21B 23/14; H02P 5/46; H02P 5/50
See application file for complete search history.

(56) References Cited

U.S. PATENT DOCUMENTS

| | | |
|---|---|---|
| 4,676,310 A | 6/1987 | Scherbatskoy et al. |
| 5,489,831 A | 2/1996 | Harris |
| 5,551,349 A | 9/1996 | Bodzin |

(Continued)

FOREIGN PATENT DOCUMENTS

EP          1640556 A1    3/2006

OTHER PUBLICATIONS

International Search Report and Written Opinion issued on Jul. 16, 2020 in PCT/US2019/058636.

(Continued)

*Primary Examiner* — Cathleen R Hutchins
*Assistant Examiner* — Ronald R Runyan
(74) *Attorney, Agent, or Firm* — Barnes & Thornburg LLP

(57) ABSTRACT

Downhole tractor control systems and methods to adjust a load of a downhole motor to drive one or more wheels of the downhole tractor are disclosed. A method to adjust a load of a downhole motor includes receiving a user input of a desired speed and torque for a plurality of motors, where the plurality of motors powering rotation of wheels of a downhole tractor. The method also includes determining a minimum actual motor speed of the plurality of motors. For at least one motor of the plurality of motors, the method includes determining a power controller output and determining a torque controller output. The method further includes adjusting a voltage source invertor based on a lesser of the power controller output and the torque controller output to modulate voltage provided to the at least one motor.

18 Claims, 10 Drawing Sheets

(56) References Cited

U.S. PATENT DOCUMENTS

| | | | |
|---|---|---|---|
| 6,273,189 B1 | 8/2001 | Gissler et al. | |
| 7,185,714 B2 | 3/2007 | Doering et al. | |
| 9,205,560 B1 * | 12/2015 | Edsinger | B25J 9/1674 |
| 10,066,631 B2 | 9/2018 | Zhang et al. | |
| 2009/0091278 A1 | 4/2009 | Montois et al. | |
| 2011/0185806 A1 | 8/2011 | Pfutzner | |
| 2015/0167416 A1 | 6/2015 | Ludwig | |
| 2016/0333653 A1 | 11/2016 | Bonderover et al. | |
| 2018/0306001 A1 | 10/2018 | Themig | |

OTHER PUBLICATIONS

Song Xinda et al., "Sensorless Direct Power Control for High-Speed PMSM Based on High-precision Rotor Position Estimation", 20th International Conference on Electrical Machines and Systems (ICEMS), 2017, DOI: 10.1109/ICEMS.2017.8055928.

Moumita Deb, "Control of Voltage Source Inverter for Adjustable Speed Drive—A Study Report", 2013 Department of Electrical Engineering, Tripura, India, ISSN:—2321-9262 (Year: 2013).

* cited by examiner

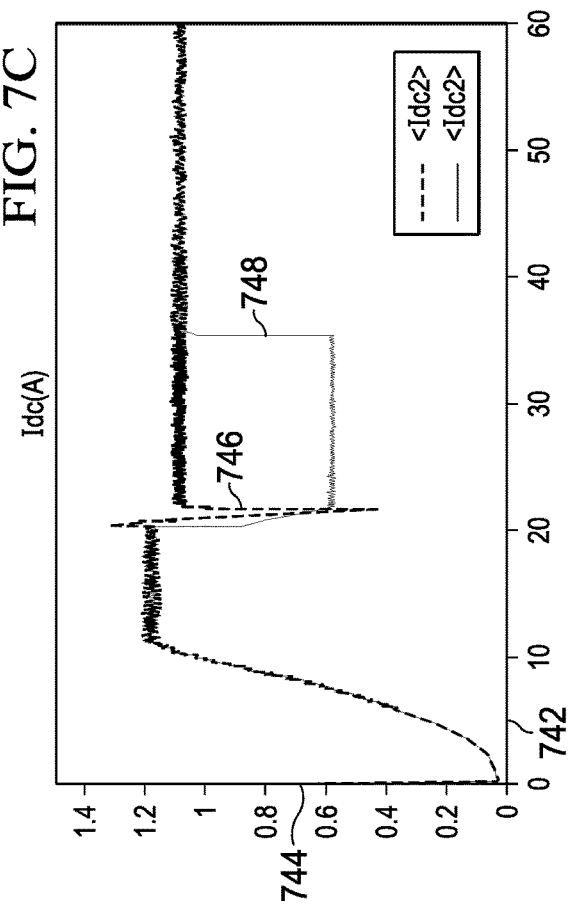
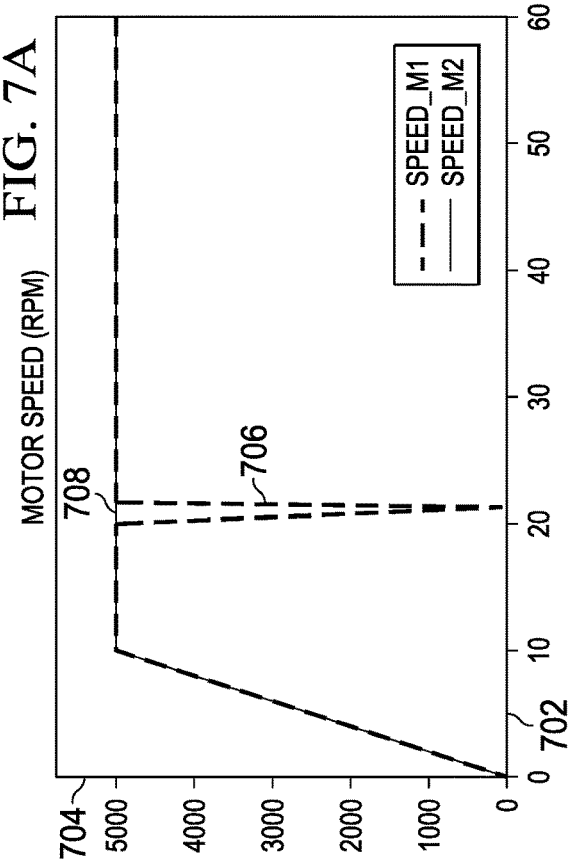
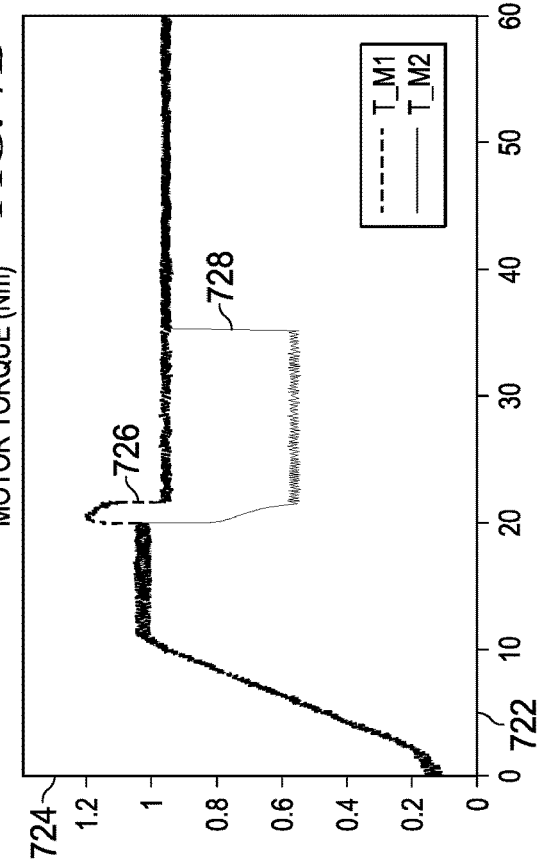
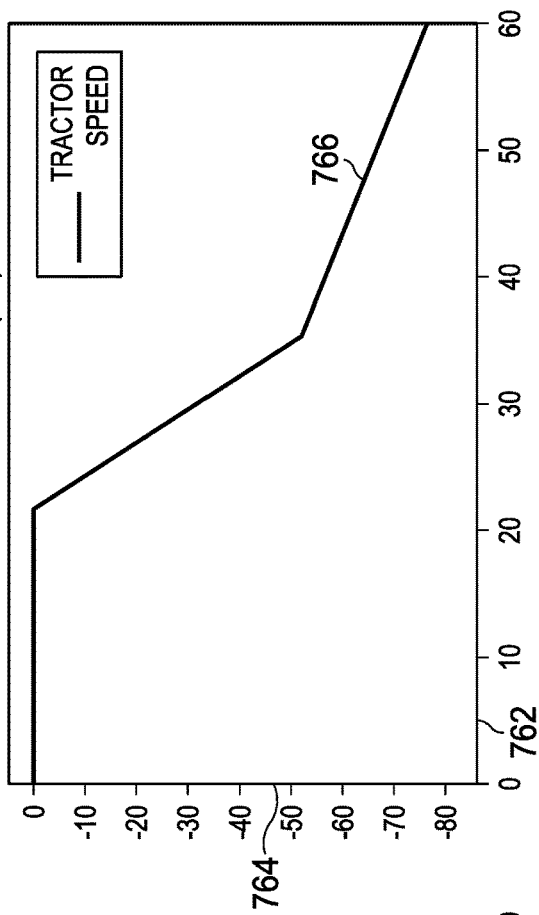

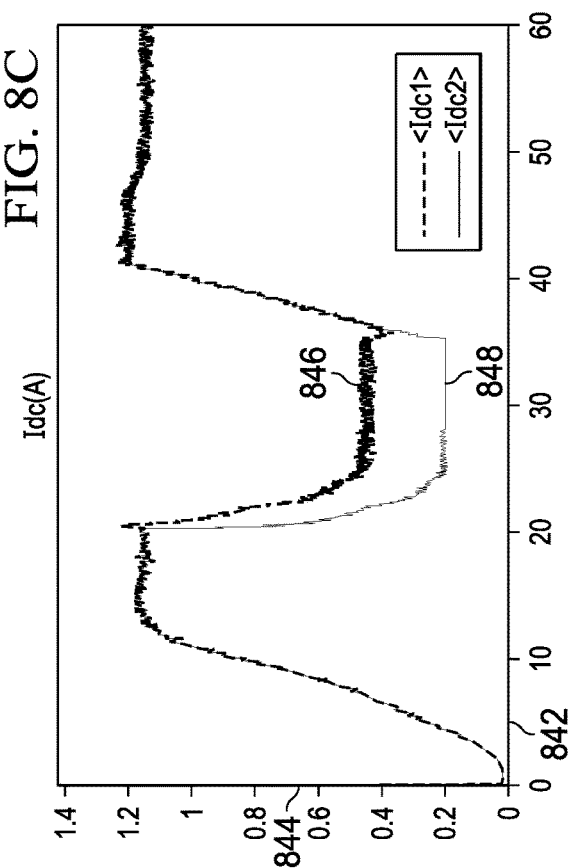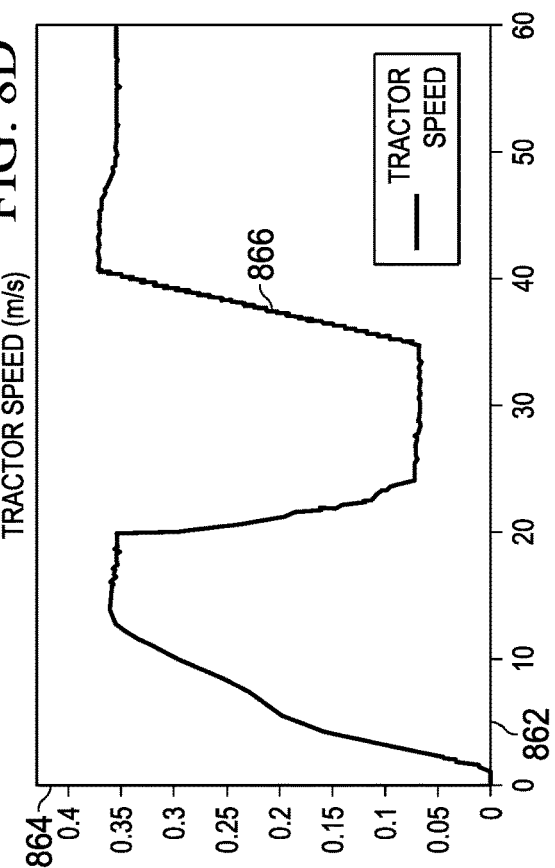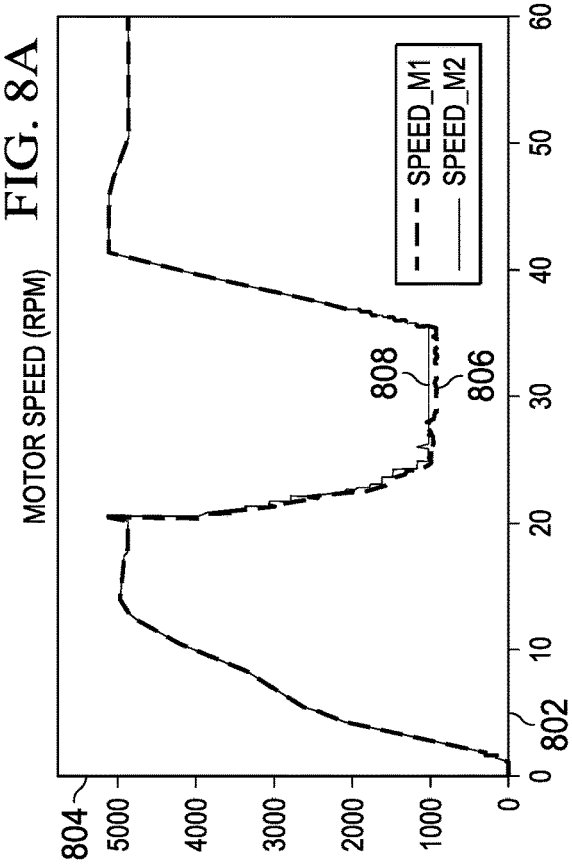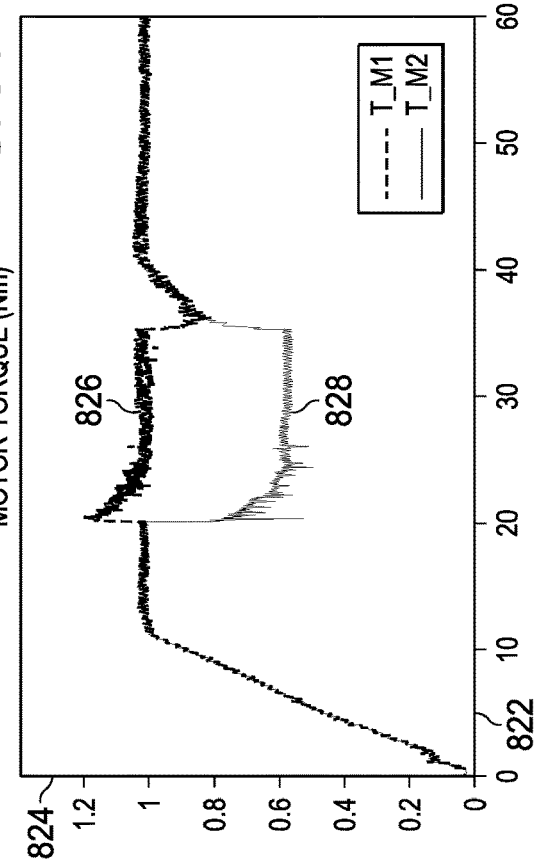

DOWNHOLE TRACTOR CONTROL SYSTEMS AND METHODS TO ADJUST A LOAD OF A DOWNHOLE MOTOR

CROSS-REFERENCE TO RELATED APPLICATION

This application is a Continuation of U.S. application Ser. No. 16/666,169 filed Oct. 28, 2019, the disclosure of which is incorporated by reference herein in its entirety.

BACKGROUND

The present disclosure relates generally to downhole tractor control systems and methods to adjust a load of a downhole motor to drive one or more wheels of the downhole tractor.

Downhole equipment used in various downhole operations including, but not limited to, drilling operations, completion operations, wireline operations, logging operations, as well as other well operations, are sometimes performed by tractors that are deployed in a wellbore. Some downhole tractors have wheels that permit traction on a wall of a casing or a wellbore to facilitate movement of the downhole tractors. Loads carried by downhole tractors are sometimes distributed unevenly, which cause some motors of the downhole tractor to rotate at a faster speed than other motors.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

FIGS. 7A-7D illustrate simulated results of motor speed, motor torque, DC bus current, and downhole tractor speed of a downhole tractor that does not perform the operations described herein and illustrated in FIG. 2 while operating in a condition where one of the wheels experiences slippage;

FIGS. 8A-8D illustrate simulated results of motor speed, motor torque, DC bus current, and downhole tractor speed of the downhole tractor of FIGS. 7A-7D, where the downhole tractor performs the operations described herein and illustrated in FIG. 2 while experiencing the same conditions as described with respect to FIGS. 7A-7D;

Figure 1:
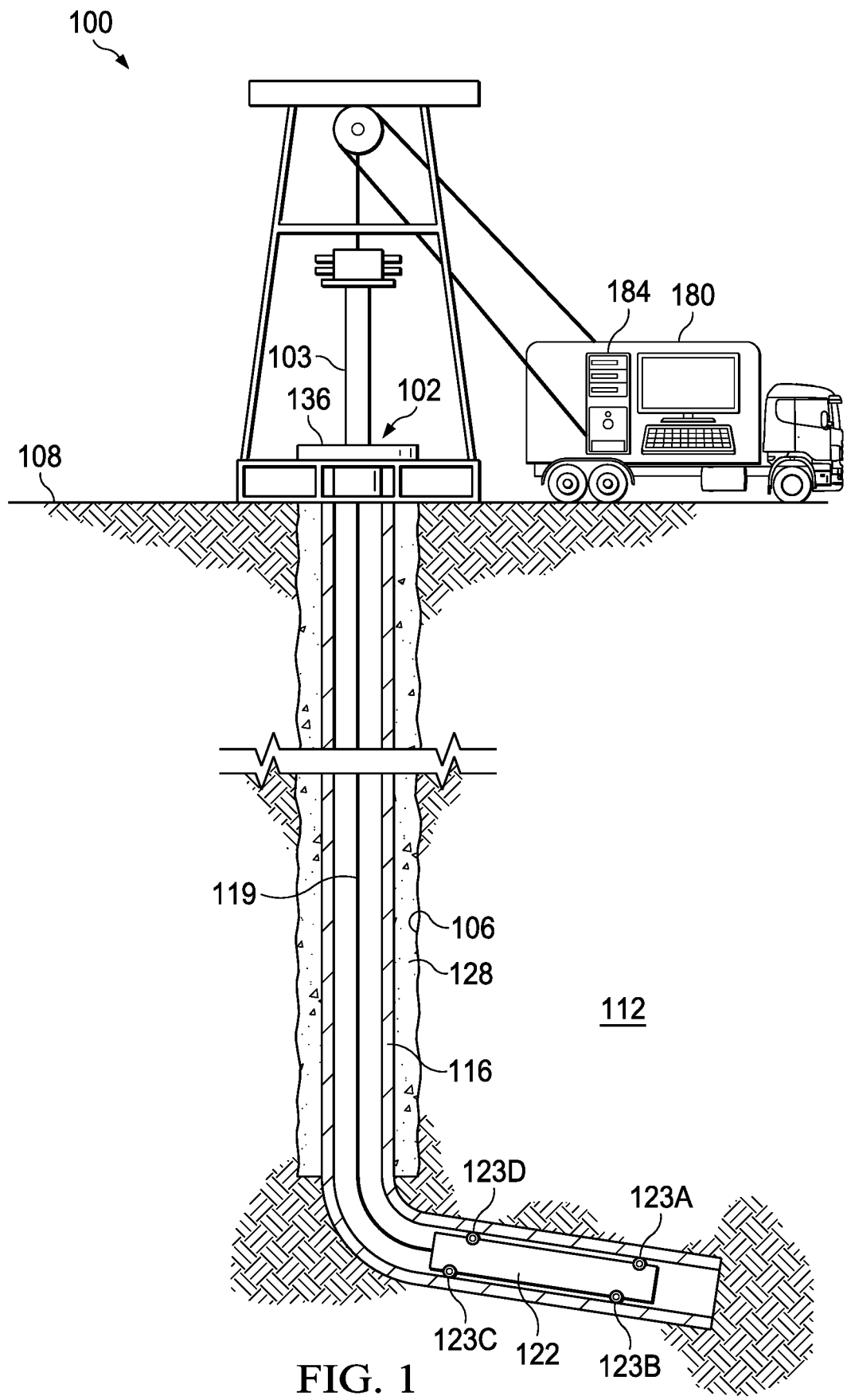
FIG. 1 illustrates a schematic, side view of a well having a downhole tractor deployed in a wellbore of the well.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to a downhole tractor. In some embodiments, the downhole tractor has wheels that permit traction on a wall of a casing or a wellbore. The present disclosure further relates to downhole tractor control systems and methods to adjust a load of a downhole motor to drive one or more wheels of the downhole tractor. The downhole tractor control system is configured to control and adjust the speed of motors of a downhole tractor and the torque generated by the motors of the downhole tractor. While a downhole tractor is traversing in a well environment, certain downhole conditions, including those described herein, as well as properties of the wheels of the downhole tractor, cause a load imbalance among different wheels of the downhole tractor. Further, different properties of the wheels and different operating conditions of motors that provide power to rotate the wheels also cause load imbalance among different wheels of the downhole tractor. Further, the load of the downhole tractor includes the weight of the downhole tractor and physical objects carried by or transported by the downhole tractor. Further, a downhole tractor control system refers to any system operable to adjust motor outputs of one or more motors of the downhole tractor based on the load of the downhole tractor or certain conditions experienced by the downhole tractor while traversing in the wellbore.

In some embodiments, the downhole tractor control system utilizes multiple motors, where each motor provides power to rotate a different wheel or set of wheels. The downhole tractor control system individually adjusts each motor based on the conditions experienced by a corresponding wheel or set of wheels to perform load-balancing operations described herein. In some embodiments, the downhole tractor control system performs operations described herein in response to a determination that the load of one or more motors is greater than a threshold value to redistribute the overall load among the wheels of the downhole tractor. In some embodiments, the downhole tractor control system performs the operations described herein in response to a determination of wheel slippage of a wheel of the downhole tractor to limit the speed of the said slipping wheel based on the desired creep. Wheel slippage occurs when adhesion of the wheel to a casing is below a threshold value and the speed of the said wheel is higher than the speed of other wheels of the downhole tractor. In some embodiments, wheel slippage occurs when a wheel is worn, when the wheel is over a slippery surface, or when the force applied on the wheel is low.

The downhole tractor control system receives user inputs of a desired speed of the motors of the downhole tractor and a desired torque of the motors that provide power to rotate the wheels of the downhole tractor. The downhole tractor control system then determines a minimum actual speed of the motors. For example, where the downhole tractor has four motors, three of which are rotating at 5,500 revolutions per minute and one is rotating at 5,000 revolutions per minute, then the minimum actual motor speed is 5,000 revolutions per minute. For each motor of the motors, the downhole tractor control system then utilizes feedback controllers to calculate errors between user-desired speed and torque of the motors and feedbacks of the speed and torque, respectively.

A feedback controller is any controller mechanism operable to continuously calculate an error between a user-desired value of a parameter (e.g., speed, torque, relative creep, etc.) and the feedback value of the parameter. In one or more of such embodiments, the feedback controller is a proportional-integral controller. In one or more of such embodiments, the feedback controller is a proportional-integral-derivative controller.

The downhole tractor control system utilizes feedback controllers to determine the power controller output, torque controller output, and in some embodiments, the creep controller output. A power controller output is a command signal to control the motor. In some embodiments, the power controller output is a command signal that is expressed as the desired voltage (in per-unit (pu)) for a voltage source inverter to control the voltage of a motor to meet a desired power reference, where the power reference is the desired input power of the motor. Further, a torque controller output is another command signal to control the motor. In some embodiments, the power controller output is a command signal that is expressed as the desired voltage (in pu) for a voltage source inverter to control the voltage of a motor to meet a desired torque reference, where the torque reference is the desired torque of the motor. Further, a creep controller output is another command signal to control the motor. In some embodiments, the creep controller output is a command signal that is expressed as the desired voltage (in pu) for a voltage source inverter to control the voltage of a motor to meet a desired creep reference, where the creep reference is the desired maximum speed of the motor. The downhole tractor control system then determines a controller adjustment output to the respective motor. A controller adjustment output is an intermediate control signal that describes the desired voltage amplitude for driving the respective motor. In some embodiments, the controller adjustment output is a lesser or minimum of the power controller output and torque controller output, where the lesser or the minimum of the power controller output and the torque controller output is the lower value between the value of the power controller output and the value of the torque controller output. In embodiments where the creep controller output is also analyzed, the controller adjustment output is the lesser or minimum of the power controller output, torque controller output, and creep controller output, where the lesser or the minimum of the power controller output, the torque controller output, and the creep controller output is the lowest value among the value of the power controller output, the torque controller output, and the creep controller output. For example, where the power controller output is 0.7 pu, the torque controller output is 1.0 pu, and the creep controller output is 1.0 pu, the controller adjustment output is 0.7 pu. A power feedback controller is a feedback controller that determines a power controller output of a motor, a torque feedback controller is a feedback controller that determines a torque controller output of a motor, and a creep feedback controller is a feedback controller that determines a creep controller output of a motor. The downhole tractor control system then designates the controller adjustment output as an input of the respective motor. Additional descriptions of the feedback controllers and processes for determining the adjustment output power are provided in the paragraphs below and are illustrated in at least FIG. 2.

In some embodiments, adjusted output is modulated by a pulse width modulator, and the adjusted output is then provided to a voltage source inverter (VSI) that is coupled to the motor. In some embodiments, the pulse width modulator converts the controller adjustment output to a set of high frequency pulse signals which is used to turn on or off power switches in VSI, thereby controlling the motor's output. In one or more of such embodiments, the set of high frequency signals controls the power switches to convert the DC bus voltage to an equivalent sinusoidal voltage on a motor terminal. The foregoing processes are periodically repeated and the most recently-obtained values of the motor are used as feedback values in the next cycle.

In some embodiments, the downhole tractor control system also includes the wheels of the downhole tractor. In some embodiments, the downhole tractor control system also includes the motors of the downhole tractor. In some embodiments, the downhole tractor control system is an onboard system of the downhole tractor. In some embodiments, one or more components of the downhole tractor control system are deployed at remote locations relative to the downhole tractor. Additional descriptions of the downhole tractor control systems and methods to adjust a load of a downhole motor to drive one or more wheels of the downhole tractor are provided in the paragraphs below and are illustrated in at least FIGS. 1-10.

Now turning to the figures, FIG. 1 illustrates a schematic, side view of an environment 100, where a downhole tractor 122 is deployed in a wellbore 106 of a well 102. In the embodiment of FIG. 1, wellbore 106 extends from a surface 108 of well 102 to or through a formation 112. A casing 116 is deployed along the wellbore 106 to insulate downhole tools and strings deployed in the casing 116 to provide surface that contacts wheels 123A-123D of downhole tractor 122, to provide a path for hydrocarbon resources flowing from the subterranean formation 112, to prevent cave-ins, and/or to prevent contamination of the subterranean formation 112. Casing 116 is normally surrounded by a cement sheath 128, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A conveyance 119, optionally carried by a vehicle 180, is positioned proximate to well 102. Conveyance 119, along with downhole tractor 122, are lowered down the wellbore 106, i.e. downhole. In one or more embodiments, the conveyance 119 and downhole tractor 122 are lowered downhole through a blowout preventer 103 and a wellhead 136. In the illustrated embodiment of FIG. 1, conveyance 119 is a wireline. In one or more embodiments, conveyance 119 may be wireline, slickline, coiled tubing, drill pipe, production tubing, fiber optic cable, or another type of conveyance operable to deploy downhole tractor 122. Conveyance 119 provides mechanical suspension of downhole tractor 122 as downhole tractor 122 is deployed downhole. In one or more embodiments, conveyance 119 also transmits signals including, but not limited to, optical signals to downhole tractor 122. In one or more embodiments, conveyance 119 also provides power to downhole tractor 122 as well as other downhole components. In one or more embodiments, conveyance 119 also provides downhole telemetry. Additional descriptions of telemetry are provided in the paragraphs below. In one or more embodiments, conveyance 119 also provides a combination of power and downhole telemetry to downhole tractor 122. For example, where the conveyance 119 is a wireline, coiled tubing (including electro-coiled-tubing), or drill pipe, power and data are transmitted along conveyance 119 to downhole tractor 122.

In the illustrated embodiment of FIG. 1, downhole tractor 122 carries a load downhole during well operations. Downhole tractor 122 includes four wheels 123A-123D that are attached to extending arms (not shown) which apply traction to a wall of casing 116 or wellbore 106 to facilitate movement of downhole tractor 122. In some embodiments, wheels 123A-123D roll over tracks (not shown) that are placed on a wall of casing 116 or wellbore 106. Downhole tractor 122 also has motors (not shown) that provide power to rotate wheels 123A-123D. In some embodiments, downhole tractor 122 has multiple motors, each configured to provide power to rotate a separate wheel. In some embodiments, each motor of downhole tractor 122 is configured to provide power to rotate a different set of wheels (e.g., wheels that are coupled to the same axle). In some embodiments, wheels 123A-123D have teeth or other profiles that improve adhesion and help wheels 123A-123D maintain grip on the tracks while moving on the tracks. Over time, wheels 123A-123D experience wear, thereby causing diameters of different wheels 123A-123D to differ from each other. In some embodiments, different downhole conditions (e.g., presence of oil on the tracks) also cause different wheels 123A-123D to experience varying amounts of slippage. Further, and in some embodiments, where downhole tractor 122 carries an unevenly distributed load, the load on different wheels 123A-123D also vary.

Downhole tractor 122 has a downhole tractor control system (illustrated in FIG. 2) that periodically determines the speed of each motor, the torque generated by each motor, the power generated by each motor, and the creep associated with each motor. The downhole tractor control system compares the determined speed, torque, power, and creep of the motors with desired speed, torque, power, and creep of the motors, and readjusts the output of one or more motors (e.g., the speed and the torque of one or more motors) to achieve the desired speed, torque, power, and creep, and to balance the load on downhole tractor 122. In some embodiments, the desired speed, torque, power, and creep are provided by an operator. In some embodiments, the desired speed, torque, power, and creep are dynamically determined based on one or more downhole properties. Similarly, the downhole tractor control system also compares the determined speed, torque, power, and creep of different motors with each other, and adjusts the output of different motors to balance the load on downhole tractor 122, and to achieve the desired speed, torque, power, and creep. Additional descriptions of operations performed by the downhole tractor control system to adjust the load on each motor and to achieve the desired motor outputs are provided in the paragraphs below and are illustrated in at least FIGS. 2-10.

In some embodiments, downhole tractor 122 is communicatively connected to the controller 184 via a telemetry system described herein and is operable to transmit data associated with inputs and outputs of the downhole tractor control system to controller 184. An operator may then access controller 184 to analyze such data. As defined herein, controller 184 represents any electronic device operable to transmit and receive data to and from downhole tractor 122. Although FIG. 1 illustrates a wireline environment, downhole tractor 122 is also deployable in other on-shore and off-shore environments and during other types of well operations. Further, although FIG. 1 illustrates a single downhole tractor 122, in some embodiments, multiple downhole tractors (not shown) are simultaneously deployed in wellbore 106. Further, although downhole tractor 122 of FIG. 1 has four wheels, in one or more embodiments, downhole tractor 122 includes a different number of wheels.

Figure 2:
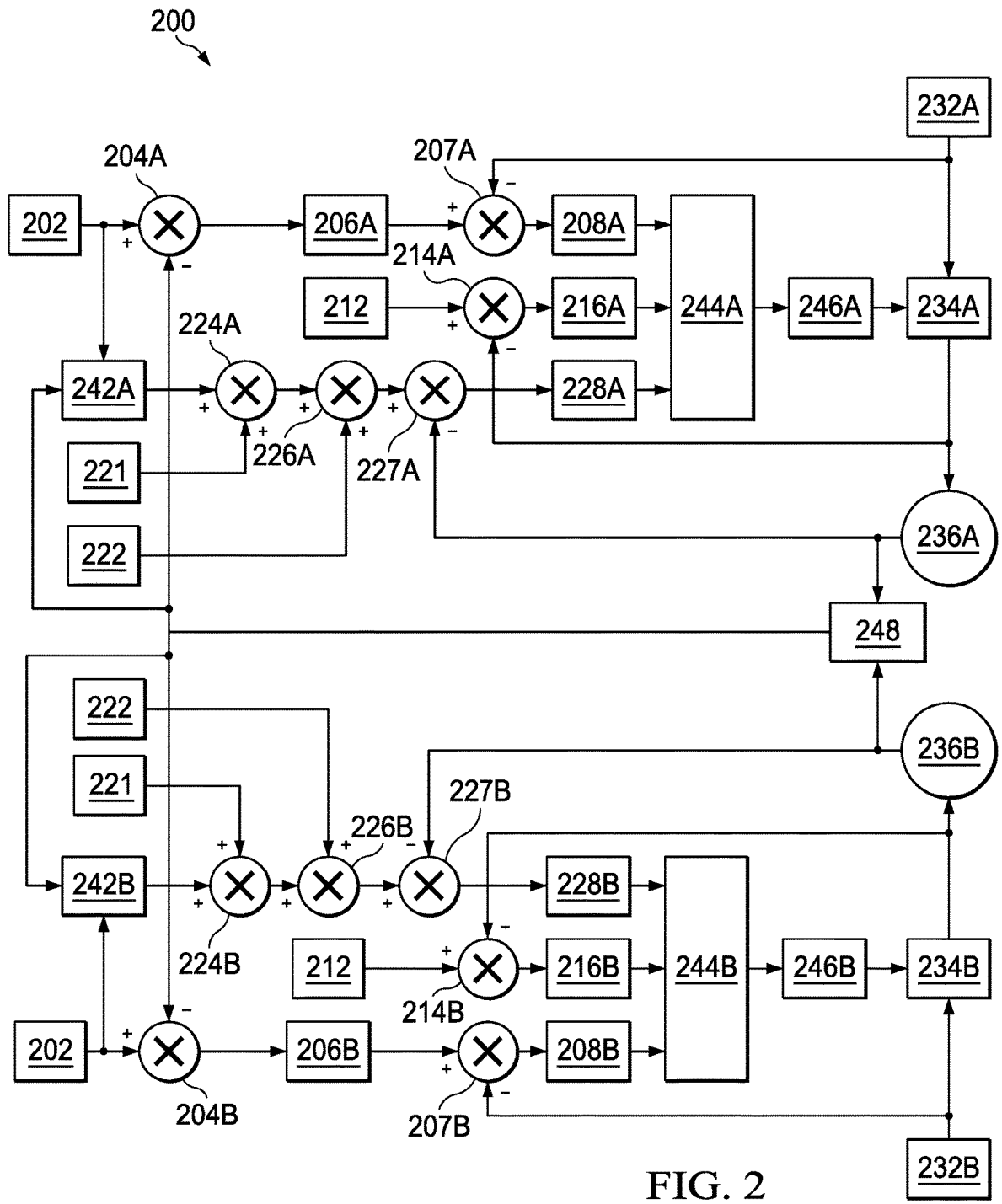
FIG. 2 illustrates a system diagram of a downhole tractor control system of the downhole tractor of FIG. 1 and configured to adjust the output of two motors of the downhole tractor.

FIG. 2 illustrates a system diagram of a downhole tractor control system 200 of downhole tractor 122 of FIG. 1 and configured to adjust the output of two motors 236A and 236B of downhole tractor 122. As shown in FIG. 2, blocks 232A and 232B represent power sources of motors 236A and 236B, respectively, and blocks 234A and 234B represent voltage source invertors that are electrically coupled to motors 236A and 236B, respectively. Further, blocks 202, 212, 221, and 222 represent the desired speed of downhole tractor 122, torque of the motors, relative creep associated with the motors, and absolute creep associated with the motors, respectively. Although FIG. 2 illustrates two blocks for each of the desired speed, desired torque, desired relative creep, and desired absolute creep to simplify the illustration of the system diagram, it is understood that downhole tractor control system 200 is configured to take in one input of the desired speed, the desired torque, the desired relative creep, and the desired absolute creep. In some embodiments, the desired speed is expressed in revolutions per minute, the desired torque is expressed in newton meters, the desired relative creep is a percentage value (e.g., 1%, 2% or another percentage value), and the desired absolute creep is an integer value (e.g., 50 revolutions per minute, 100 revolutions per minute, or another integer value). In some embodiments, an operator enters the desired parameters. In some embodiments, downhole tractor control system 200 dynamically determines the desired parameters based on current wellbore conditions as well as the load on downhole tractor 122.

At block 204A, downhole tractor control system 200 determines an error between the desired motor speed and a feedback of the minimum motor speed among motors 236A and 236B. The error between the desired motor speed and the feedback of the minimum motor speed is the difference between the desired motor speed and the feedback of the minimum motor speed. For example, where the desired motor speed is 5,000 revolutions per minute, and the minimum motor speed is also 5,000 revolutions per minute, then the error is 0. In that regard, block 248 represents system logic for determining the minimum motor speed of motors 236A and 236B. At block 206A, downhole tractor control system enters the error determined at block 204A as an input of a feedback controller (speed feedback controller), and obtains an output of the speed controller (speed controller output), where the speed controller output is a command signal which is used as a power reference of motor 236A, where the power reference is a desired input power of motor 236A.

At block 207A, downhole tractor control system 200 determines a power reference of motor 236A based on the output of the speed feedback controller and an error between the power reference of motor 236A and a feedback of the power of motor 236A. In some embodiments, the value of the feedback of the power of a motor is expressed by the value of a feedback DC bus current from power source 232A, where the feedback DC bus current is an equivalent value of power provided by the respective motor. In some embodiments, 1 A of DC bus current is equal to 600 watts for 600V DC bus voltage. Continuing with the foregoing example, where the power reference is 1 A and the feedback DC current is also 1 A, the determined error at block 207A is 0 A. At block 208A, downhole tractor control system 200 enters the error determined at block 207A into a power feedback controller to determine a power controller output. In the illustrated embodiment of FIG. 2, the power controller output is 0.7 pu.

Turning to 214A, downhole tractor control system 200 determines at block 214A an error between the desired motor torque and a feedback torque of motor 236A. The error between the desired motor torque and the feedback torque of the motor is the difference between the desired motor torque and the feedback torque of the motor. In some embodiments, the value of the feedback of torque of a motor is expressed by the value of a feedback phase current from the VSI 232A, where the feedback phase current is an equivalent value of torque provided by the respective motor. For example, where the desired motor torque is 1.2 newton meters (Nm) and the feedback torque of motor 236A is 0.9 Nm, then the error is 0.3 Nm. At block 216A, downhole tractor control system 200 enters the error determined at block 214A into a torque feedback controller to determine a torque controller output. In the illustrated embodiment of FIG. 2, the torque controller output is approximately 1.0 pu.

Turning to 224A, downhole tractor control system 200 determines at block 224A a reference (relative creep reference) between the minimum of the motor speed of motors 236A and 236B (determined in block 242A) and the relative creep. Continuing with the foregoing example, where the minimum motor speed is 5,000 revolutions per minute, a product of the minimum motor speed of 5,000 revolutions per minute and a relative creep of 5% is 250 revolutions per minute, the relative creep reference is 5,250 revolutions per minute. Downhole tractor control system 200 determines at block 226A an error (absolute creep reference) between the output of block 224A and the absolute creep. In some embodiments, the output of the absolute creep reference is determined by the following equation:

$$\text{Absolute creep reference} = \text{ceil}\left(\frac{W_{min} \times (1 + \text{Relative\_creep})}{\text{Absolute\_creep}}\right) \times \text{Absolute\_creep} \quad \text{EQ. 1}$$

where Wmin is the minimum actual speed among all motors. In some embodiments, the value of the speed of the downhole tractor is expressed by the minimum actual speed among all motors, where the minimum actual speed among all motors is an equivalent value of the speed of the downhole tractor. Absolute Creep Reference is obtained at block 221, and absolute creep is obtained at block 222. In some embodiments, the output of the absolute creep reference is the output of the relative creep reference rounded up by the value of the absolute creep obtained at block S222. Continuing with the foregoing example, where the output of block 224A is 5,250 revolutions per minute and the absolute creep is 100 revolutions per minute, the absolute creep reference is 5,300 revolutions per minute. At block 227A, downhole tractor control system 200 determines an error between the output of block 226A and the feedback speed of motor 236A. Continuing with the foregoing example, where the output of block 226A is 5,300 revolutions per minute and the feedback speed of motor 236A is 5,000 revolutions per minute, then the error is 300 revolutions per minute. At block 228A, downhole tractor control system 200 enters the error determined at block 227A into a creep feedback controller to determine a creep controller output. In the illustrated embodiment of FIG. 2, the output of the creep feedback controller is approximately 1.0 pu.

At block S244A, downhole tractor control system 200 determines a controller adjustment output of motor 236A, where the controller adjustment output of motor 236A is the minimum of the power controller output, the torque controller output, and the creep controller output of motor 236A. Continuing with the foregoing example, where the power controller output is 0.7 pu, the torque controller output is approximately 1.0 pu, and the creep controller output is also approximately 1.0 pu, the controller adjustment output of motor 236A is 0.7 pu. At block 246A, downhole tractor control system 200 performs a pulse width modulation of the controller adjustment output to convert sinusoidal signals indicative of the controller adjustment output to a set of pulse signals that control duty cycles of one or more power switches of VSI 234A. Adjustments made to VSI 234A modulate the voltage provided to motor 236A, thereby adjusting the output (e.g., speed, torque, and power) of motor 236A. The adjusted speed and torque are designated as feedback motor speed and feedback torque when the operations described above are repeated to make further adjustments of the output of motor 236A.

Operations performed by downhole tractor control system 200 at blocks 204B, 206B, 207B, 208B, 214B, 216B, 224B, 226B, 227B, 228B, 242B, 244B, and 246B to adjust VSI 234B and to adjust the output of motor 236B are similar to the operations performed at blocks 204A, 206A, 207A, 208A, 214A, 216A, 224A, 226A, 227A, 228A, 242A, 244A, and 246A, which are described above. In some embodiments, operations illustrated in FIG. 2 are simultaneously performed to adjust the motor output of both motors 236A and 236B. In some embodiments, downhole tractor control system 200 simultaneously performs operations illustrated in FIG. 2 to determine the power control feedback, torque control feedback, and the creep control feedback of motors 236A and 236B. In some embodiments, downhole tractor control system 200 utilizes proportional-integral controllers at blocks 206A, 208A, 216A, 228A, 206B, 208B, 216B, and 228B to determine different controller outputs of motors 236A and 236B. In some embodiments, downhole tractor control system 200 utilizes proportional-integral-derivate controllers at blocks 206A, 208A, 216A, 228A, 206B, 208B, 216B, and 228B to determine different controller outputs of motors 236A and 236B. In some embodiments, downhole tractor control system 200 utilizes a combination of proportional-integral controller and proportional-integral-derivate controllers at blocks 206A, 208A, 216A, 228A, 206B, 208B, 216B, and 228B to determine different controller outputs of motors 236A and 236B. Although FIG. 2 illustrates a system diagram for two motors, in some embodiments, the system diagram is expanded to adjust the output of more motors, or is simplified (e.g., by using only the upper or lower half of the system diagram) to adjust the output of one motor. As stated herein, the operations described above and illustrated in FIG. 2 are performed to dynamically adjust the load on a downhole tractor. The operations described herein and illustrated in FIG. 2 are also performed to reduce the torque divergence, maintain similar power output among different motors, reduce the likelihood of slippage, and maintain system operation during various adverse conditions, including loss of arm pressure to one or more wheels, slippage of one or more wheels, as well as other adverse conditions experienced by the downhole tractor. Examples of adverse conditions experienced by the downhole tractor are described in the paragraphs below and operational parameters of the downhole tractor are illustrated in FIGS. 3A-3D, 5A-5D, and 7A-7D. Further, descriptions of the downhole tractor operating in such adverse conditions while performing the operations described herein and illustrated in at least FIG. 2 and operational parameters of the downhole tractor are illustrated in FIGS. 4A-4D, 6A-6D, and 8A-8D.

Figure 3C:
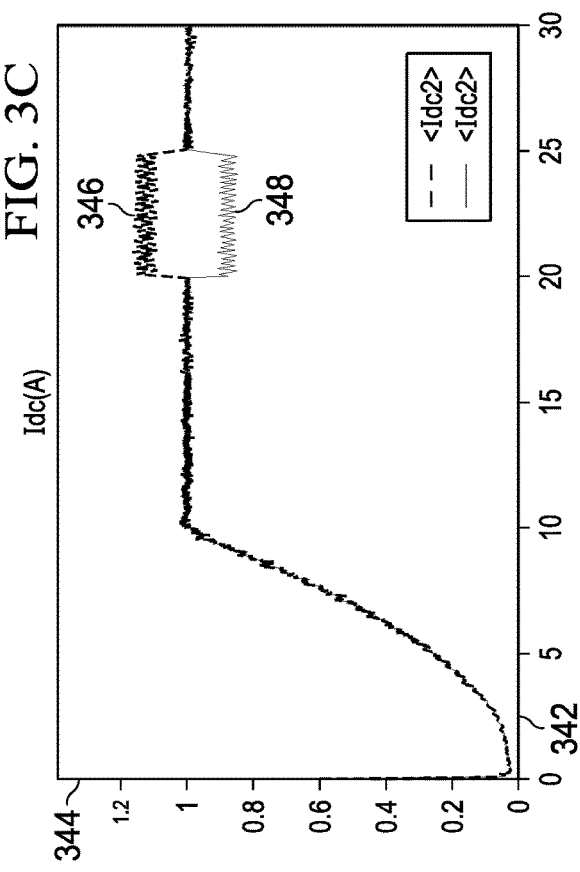
FIGS. 3A-3D illustrate simulated results of motor speed, motor torque, DC bus current, and downhole tractor speed of a downhole tractor that does not perform the operations described herein and illustrated in FIG. 2 while operating in a condition where arm pressure on a wheel powered by one or the motors decreases.
Figure 3A:
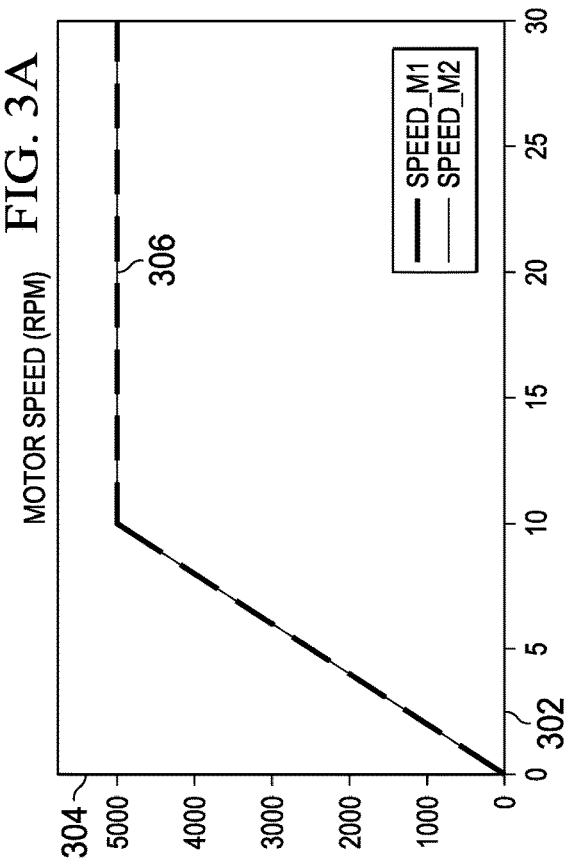
Figure 3D:
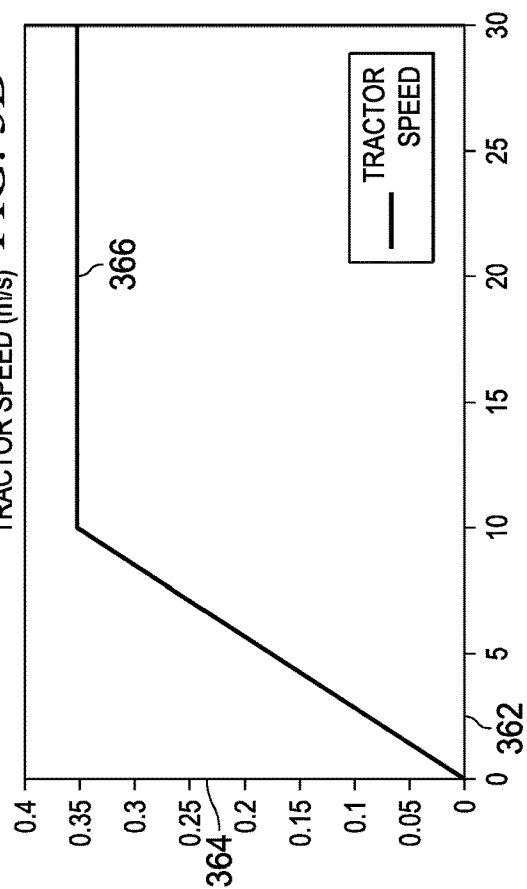
Figure 3B:
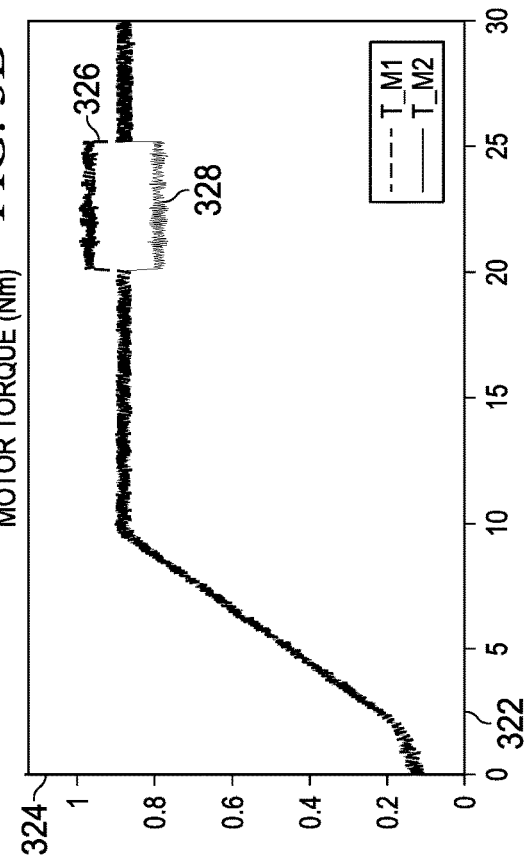

FIGS. 3A-3D illustrate simulated results of motor speed, motor torque, DC bus current, and downhole tractor speed of a downhole tractor that does not perform the operations described herein and illustrated in FIG. 2 while operating in a condition where arm pressure on a wheel electrically coupled to one or more of the motors decreases. More particularly, the arm pressure on a wheel of the first motor (first wheel) remains constant while the arm pressure on another wheel of the second motor (second wheel) drops from time 20 seconds to time 25 seconds, thereby reducing the normal force of the second motor by 40% from time 20 seconds to time 25 seconds. FIG. 3A is a graph of the motor speeds of the first and second motors (e.g., motors 236A and 236B of FIG. 2) over time, where axis 302 represents time, axis 304 represents motor speed, and line 306 represents speed of the motors. As shown in FIG. 3A, the decrease in arm pressure does not significantly cause a decrease in the motor speed. FIG. 3B is a graph of the motor torque of the two motors over time, where axis 322 represents time, axis 324 represents motor torque, and lines 326 and 328 represent motor torque of the first motor and the second motor, respectively. As shown in FIG. 3B, the drop in arm pressure results in a divergence in the motor torque of the first and the second motor. More particularly, the motor torque of the second motor dropped to approximately 0.8 Nm from time 20 seconds to time 25 seconds due to the drop in arm pressure, whereas the motor torque of the first motor increased to approximately 1.0 Nm from time 20 seconds to time 25 to compensate.

FIG. 3C is a graph of the DC bus current of the two motors over time, where axis 342 represents time, axis 344 represents current, and lines 346 and 348 represent the DC bus current of the first motor and the second motor, respectively. As shown in FIG. 3C, the drop in arm pressure also results in a divergence in the DC bus current of the first and the second motor. More particularly, the DC bus current of the second motor dropped to approximately 0.9 A from time 20 seconds to time 25 seconds due to the drop in arm pressure, whereas the DC bus current of the first motor increased to approximately 1.2 A from time 20 seconds to time 25 seconds to compensate. FIG. 3D is a graph of the speed of the downhole tractor, where axis 362 represents time, axis 364 represents speed, and line 366 represents the speed of the downhole tractor. As shown in FIGS. 3B-3D, additional output from the first motor compensated for the drop in arm pressure due to the second pressure, thereby allowing the downhole tractor to maintain speed from time 20 seconds to time 25 seconds. However, over time, variance in the torque output of different motors of the downhole tractor causes additional wear on the motors, thereby resulting in premature failure of the downhole tractor.

Figure 4A:
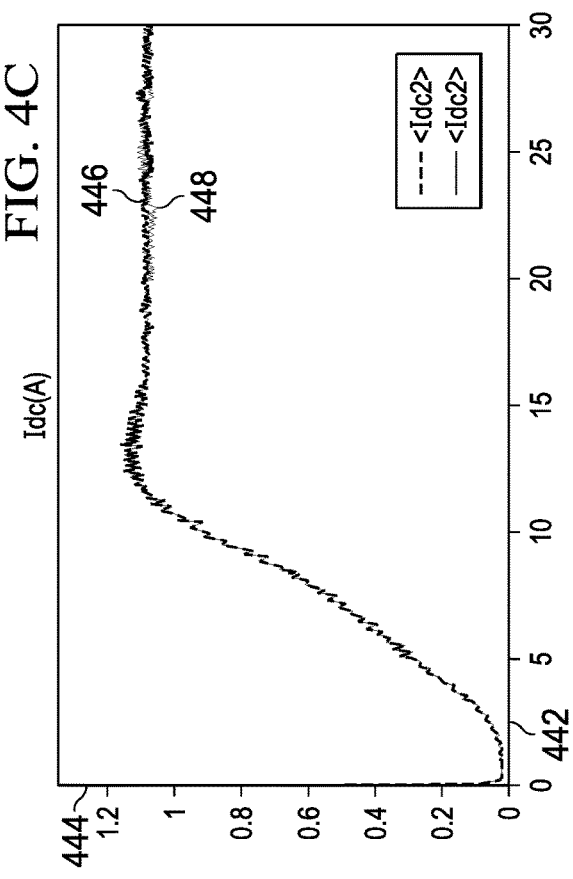
FIGS. 4A-4D illustrate simulated results of motor speed, motor torque, DC bus current, and downhole tractor speed of the downhole tractor of FIGS. 3A-3D, where the downhole tractor performs the operations described herein and illustrated in FIG. 2 while experiencing the same conditions as described with respect to FIGS. 3A-3D.
Figure 4B:
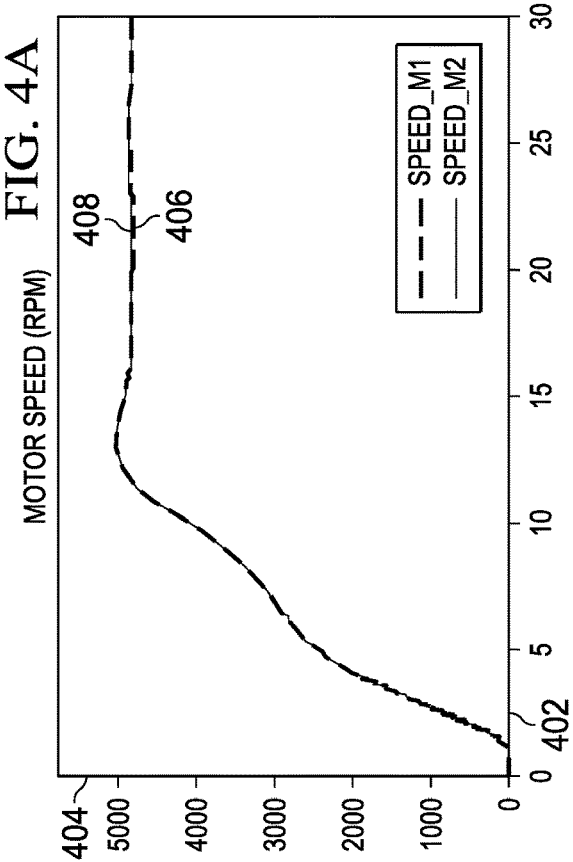

FIGS. 4A-4D illustrate simulated results of motor speed, motor torque, DC bus current, and downhole tractor speed of the downhole tractor of FIGS. 3A-3D, where the downhole tractor performs the operations described herein and illustrated in FIG. 2 while experiencing the same conditions as described with respect to FIGS. 3A-3D. FIG. 4A is a graph of the motor speeds of the first and the second motors (e.g., motors 236A and 236B of FIG. 2) over time, where axis 402 represents time, axis 404 represents motor speed, line 406 represents speed of the first motor, and line 408 represents the speed of the second motor. As shown in FIG. 4A, the motor speed of the two motors are approximately identical from time 20 seconds to time 25 seconds. FIG. 4B is a graph of the motor torque of the two motors over time, where axis 422 represents time, axis 424 represents motor torque, and lines 426 and 428 represent motor torque of the first motor and the second motor, respectively. As shown in FIG. 4B, lines 426 and 428 are more closely aligned relative to lines 326 and 328 of FIG. 3B. More particularly, performance of the operations illustrated in FIG. 2 results in a reduction in the variance of the motor torque of the two motors.

Figure 4C:
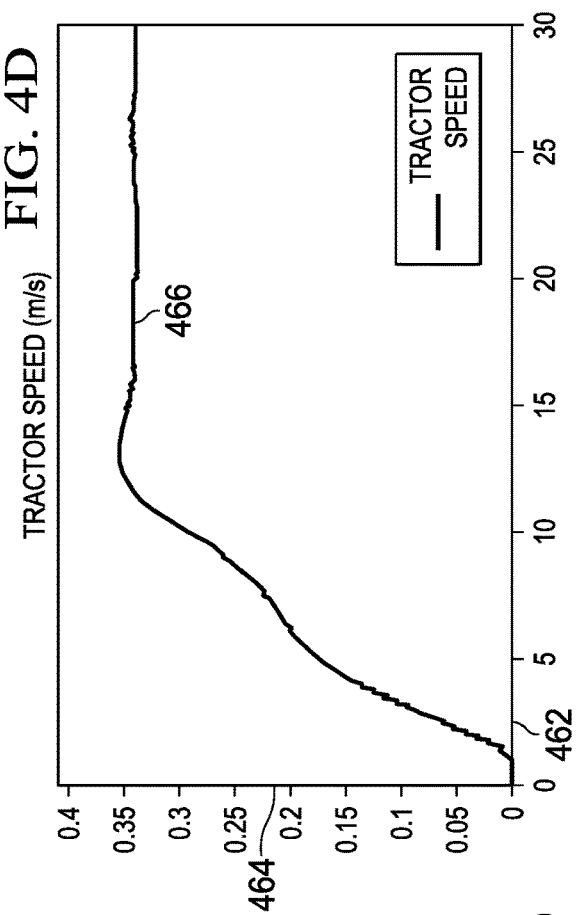
Figure 4D:
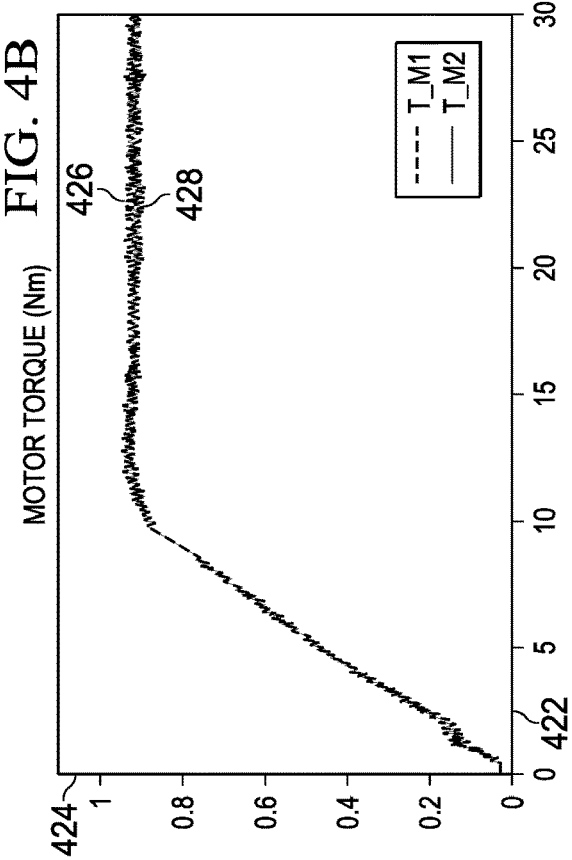

FIG. 4C is a graph of the DC bus current of the two motors over time, where axis 442 represents time, axis 444 represents current, and lines 446 and 448 represent the DC bus current of the first motor and the second motor, respectively. As shown in FIG. 4C, lines 446 and 448 are more closely aligned relative to lines 346 and 348 of FIG. 3C. In that regard, performance of the operations illustrated in FIG. 2 also results in a reduction in the variance of the DC bus current of the two motors. FIG. 4D is a graph of the speed of the downhole tractor, where axis 462 represents time, axis 464 represents tractor speed, and line 466 represents the speed of the downhole tractor. As shown in FIGS. 4B-4D, performance of the operations illustrated in FIG. 2 allows the downhole tractor to maintain near constant speed from time 20 seconds to time 25 seconds, while reducing the variance in the torque output of different motors of the downhole tractor, thereby prolonging the operational expectancy of the downhole tractor.

Figure 5A:
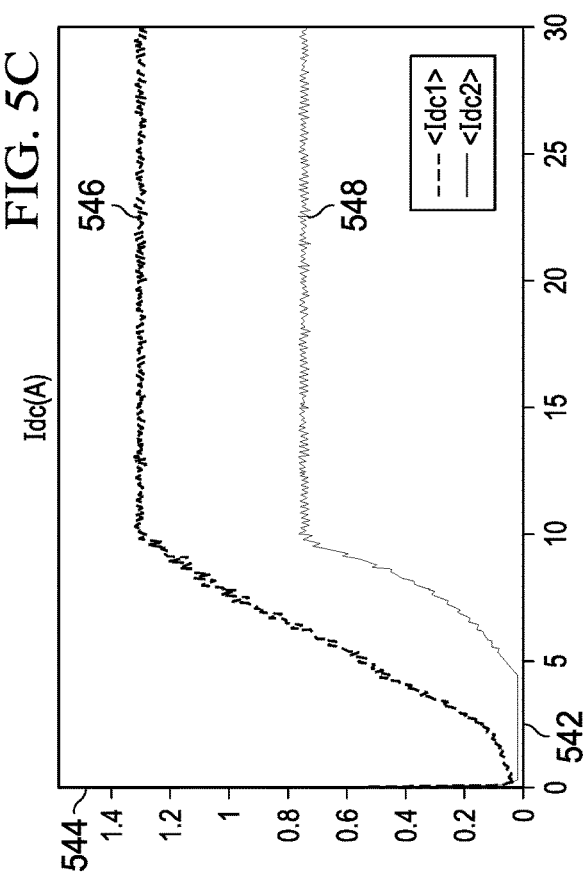
FIGS. 5A-5D illustrate simulated results of motor speed, motor torque, DC bus current, and downhole tractor speed of a downhole tractor that does not perform the operations described herein and illustrated in FIG. 2 while operating in a condition where the diameter of one wheel differs from the diameter of another wheel.
Figure 5C:
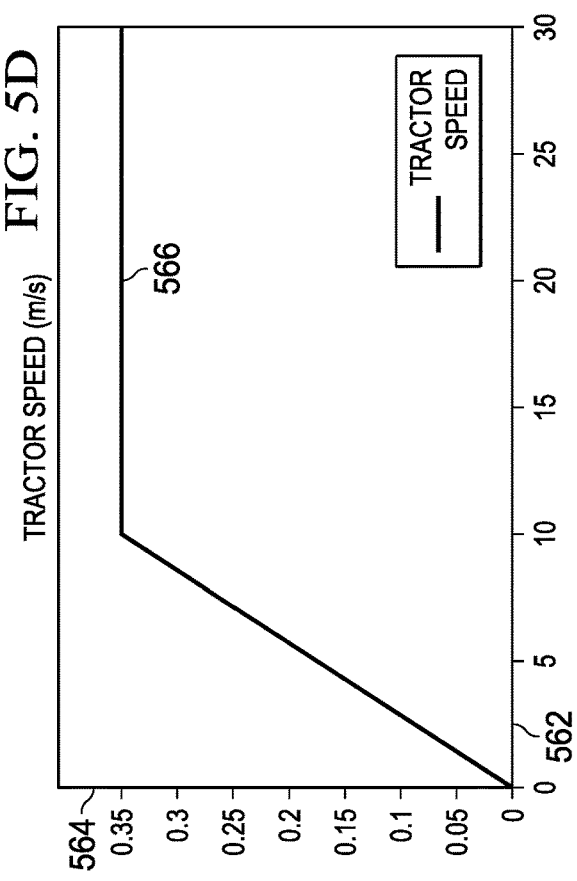
Figure 5B:
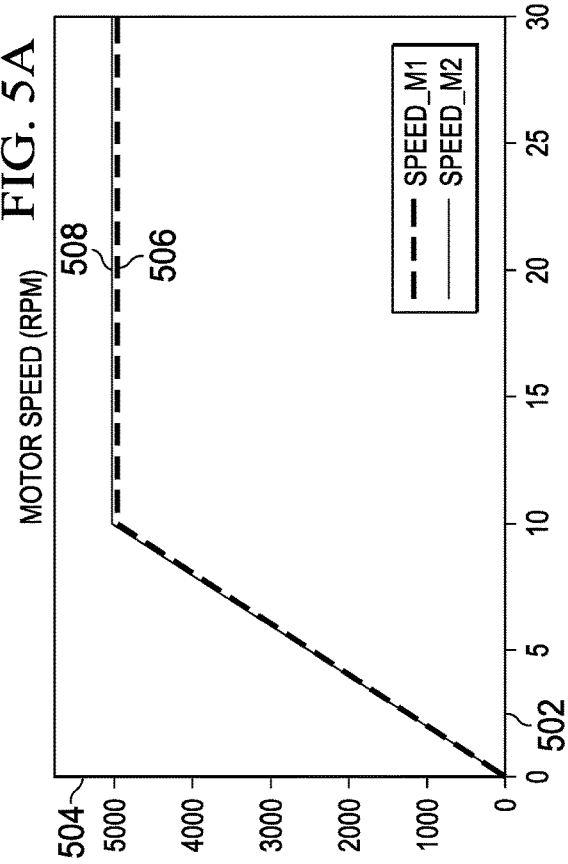

FIGS. 5A-5D illustrate simulated results of motor speed, motor torque, DC bus current, and downhole tractor speed of a downhole tractor that does not perform the operations described herein and illustrated in FIG. 2 while operating in a condition where the diameter of one wheel differs from the diameter of another wheel. More particularly, the diameter of a wheel of the second motor (second wheel) is approximately 2.5% less than the diameter of a first wheel of the first motor (first wheel). FIG. 5A is a graph of the motor speeds of two motors (e.g., motors 236A and 236B of FIG. 2) over time, where axis 502 represents time, axis 504 represents motor speed, line 506 represents speed of the first motor, and line 508 represents speed of the second motor. As shown in FIG. 5A, the decrease in wheel diameter of the second wheel causes the second motor to run at a faster speed relative to the first motor to compensate for the decrease in the diameter of the second wheel. FIG. 5B is a graph of the motor torque of the two motors over time, where axis 522 represents time, axis 524 represents motor torque, and lines 526 and 528 represent motor torque of the first motor and the second motor, respectively. As shown in FIG. 5B, a small change in the diameter of the second wheel results in a significant divergence in the motor torque of the first and the second motor. More particularly, the motor torque of the second motor from time 10 seconds is approximately 0.7 Nm, whereas the motor torque of the first motor is approximately 1.15 Nm, and approximately 65% higher than the motor torque of the second motor to compensate.

Figure 5D:
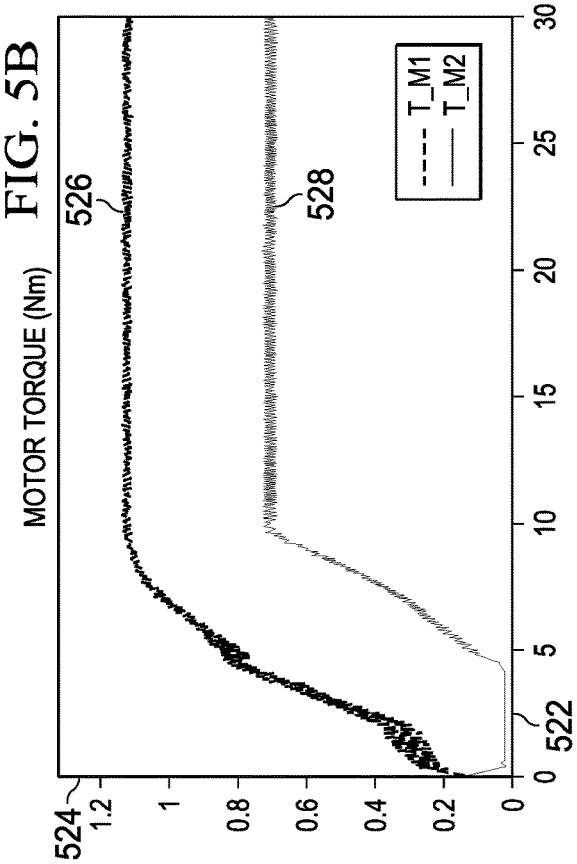

FIG. 5C is a graph of the DC bus current of the two motors over time, where axis 542 represents time, axis 544 represents current, and lines 546 and 548 represent the DC bus current of the first motor and the second motor, respectively. As shown in FIG. 5C, the reduction in the diameter of the second wheel also results in a divergence in the DC bus current of the first and the second motor. More particularly, the DC bus current of the second motor from time 10 seconds is approximately 0.75 A, whereas the DC bus current of the first motor from time 10 seconds is approximately 1.3 A, approximately 75% greater than the DC bus current of the second motor. FIG. 5D is a graph of the speed of the downhole tractor, where axis 562 represents time, axis 564 represents tractor speed, and line 566 represents the speed of the downhole tractor. As discussed herein, the variance in the torque output of different motors of the downhole tractor causes additional wear on the motors, thereby resulting in premature failure of the downhole tractor.

Figure 6A:
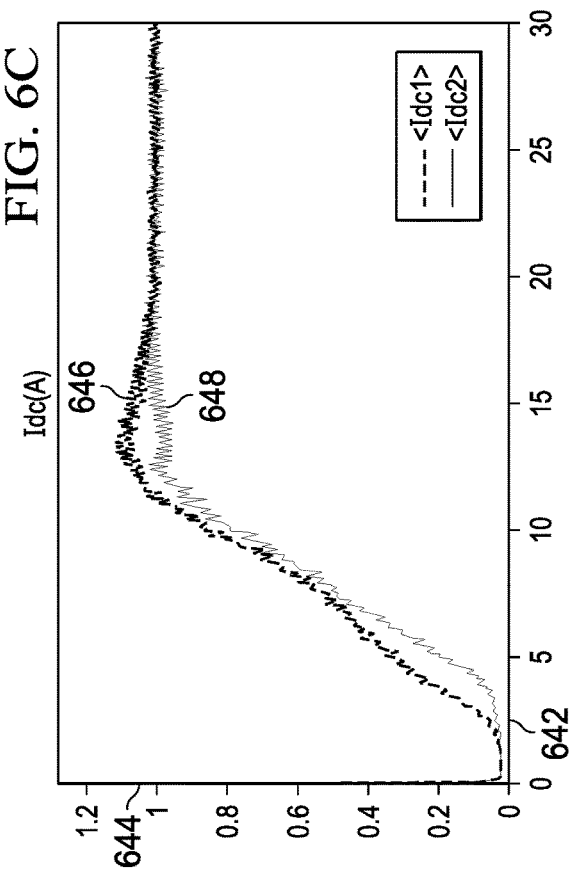
FIGS. 6A-6D illustrate simulated results of motor speed, motor torque, DC bus current, and downhole tractor speed of the downhole tractor of FIGS. 5A-5D, where the downhole tractor performs the operations described herein and illustrated in FIG. 2 while experiencing the same conditions as described with respect to FIGS. 5A-5D.
Figure 6C:
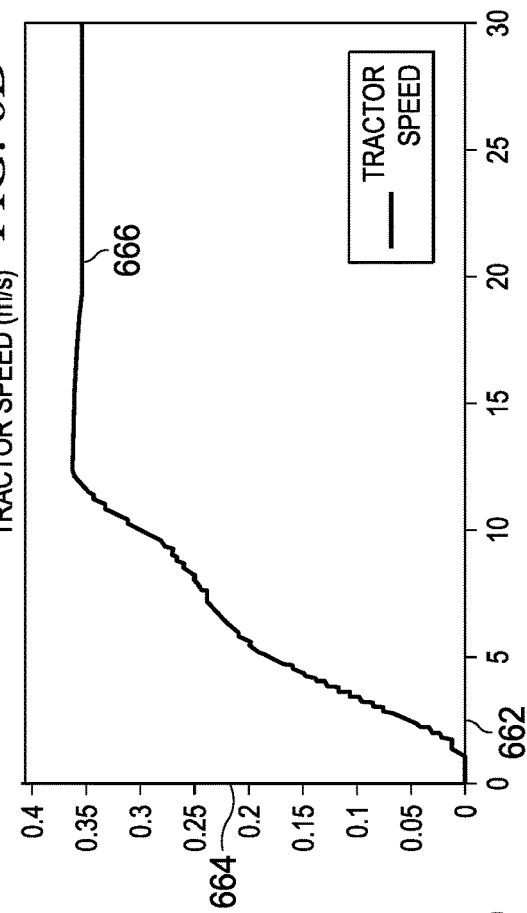
Figure 6B:
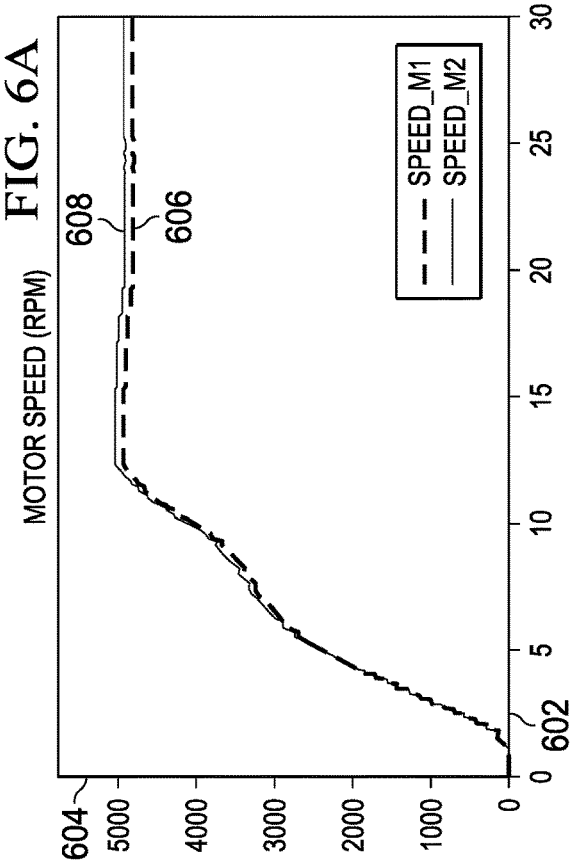

FIGS. 6A-6D illustrate simulated results of motor speed, motor torque, DC bus current, and downhole tractor speed of the downhole tractor of FIGS. 5A-5D, where the downhole tractor performs the operations described herein and illustrated in FIG. 2 while experiencing the same conditions as described with respect to FIGS. 5A-5D. FIG. 6A is a graph of the motor speeds of the first and second motors (e.g., motors 236A and 236B of FIG. 2) over time, where axis 602 represents time, axis 604 represents motor speed, line 606 represents speed of the first motor, and line 608 represents the speed of the second motor. As shown in FIG. 6A, performance of the operations described in FIG. 2 maintains the motor speed of the two motors at approximately identical speeds. FIG. 6B is a graph of the motor torque of the two motors over time, where axis 622 represents time, axis 624 represents motor torque, and lines 626 and 628 represent motor torque of the first motor and the second motor, respectively. As shown in FIG. 6B, lines 626 and 628 from time 20 seconds on are approximately identical, indicating that the motors are eventually configured to output approximately identical torque after an initial period (e.g., 20 seconds).

Figure 6D:
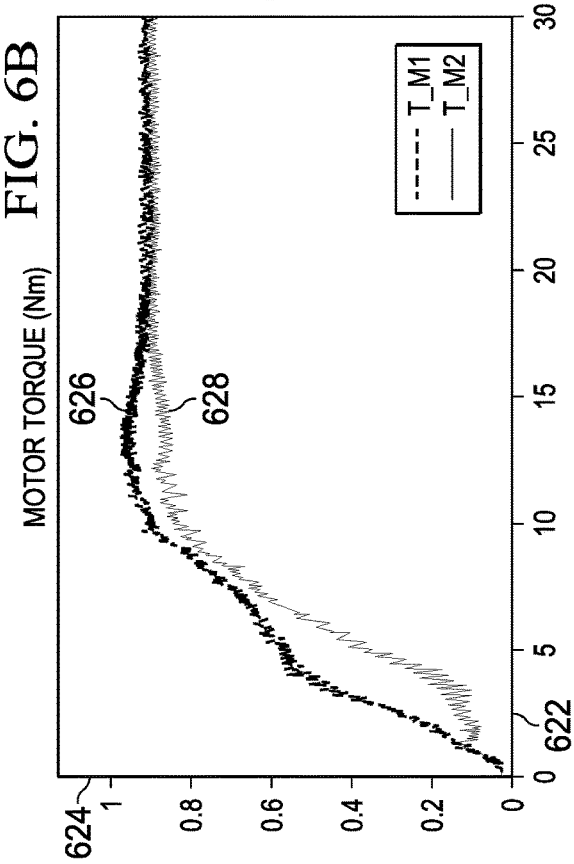

FIG. 6C is a graph of the DC bus current of the two motors over time, where axis 642 represents time, axis 644 represents current, and lines 646 and 648 represent the DC bus current of the first motor and the second motor, respectively. As shown in FIG. 6C, from time 20 seconds on, lines 646 and 648 are closely aligned relative to lines 546 and 548 of FIG. 5C from the same period. In that regard, performance of the operations illustrated in FIG. 2 also results in a reduction in the variance of the DC bus current of the two motors. FIG. 6D is a graph of the speed of the downhole tractor, where axis 662 represents time, axis 664 represents tractor speed, and line 666 represents the speed of the downhole tractor. As shown in FIGS. 6B-6D, performance of the operations illustrated in FIG. 2 allows the downhole tractor to maintain near constant speed from time 20 seconds on while reducing the variance in the torque output of different motors of the downhole tractor, thereby prolonging the operational expectancy of the downhole tractor.

FIGS. 7A-7D illustrate simulated results of motor speed, motor torque, DC bus current, and downhole tractor speed of a downhole tractor that does not perform the operations described herein and illustrated in FIG. 2 while operating in a condition where one of the wheels experiences slippage. More particularly, the arm pressure on a wheel of the first motor (first wheel) remains constant while the arm pressure on a wheel of the second motor (second wheel) drops from time 20 seconds to time 25 seconds, thereby reducing the normal force of the second motor by 70% from time 20 seconds to time 25 seconds, while the normal force of the first motor remains constant. FIG. 7A is a graph of the motor speeds of the first and second motors (e.g., motors 236A and 236B of FIG. 2) over time, where axis 702 represents time, axis 704 represents motor speed, and lines 706 and 708 represent speed of the first motor and the second motor, respectively. As shown in FIG. 7A, the drop in arm pressure temporarily causes the motor speed of the first motor to drop to near 0 before the motor speed of the first motor increases to around 5,000 revolutions per minute. FIG. 7B is a graph of the motor torque of the two motors over time, where axis 722 represents time, axis 724 represents motor torque, and lines 726 and 728 represent motor torque of the first motor and the second motor, respectively. As shown in FIG. 7B, the drop in arm pressure results in a temporary increase and subsequent decrease in the torque output of the first motor from approximately time 20 seconds to time 22 seconds, and also results in a temporary drop in the torque output of the second motor from approximately time 20 seconds to time 35 seconds.

FIG. 7C is a graph of the DC bus current of the two motors over time, where axis 742 represents time, axis 744 represents current, and lines 746 and 748 represent the DC bus current of the first motor and the second motor, respectively. As shown in FIG. 7C, the drop in arm pressure also results in a temporary divergence in the DC bus current of the first and the second motor from approximately time 20 seconds to approximately time 35 seconds. FIG. 7D is a graph of the speed of the downhole tractor, where axis 762 represents time, axis 764 represents tractor speed, and line 766 represents the speed of the downhole tractor. As shown in FIG. 7D, although the motor speed is eventually maintained at approximately 5,000 revolutions per minute, the downhole tractor slows down due to a decrease in frictional force transferred from the wheels. As a result, slippage occurs, thereby stalling the downhole tractor. However, the motors of the downhole tractors continue to run even while the downhole tractor has stalled, thereby causing additional wear on the wheels, and resulting in premature failure of the downhole tractor.

FIGS. 8A-8D illustrate simulated results of motor speed, motor torque, DC bus current, and downhole tractor speed of the downhole tractor of FIGS. 7A-7D, where the downhole tractor performs the operations described herein and illustrated in FIG. 2 while experiencing the same conditions as described with respect to FIGS. 7A-7D. FIG. 8A is a graph of the motor speeds of the first and second motors (e.g., motors 236A and 236B of FIG. 2) over time, where axis 802 represents time, axis 804 represents motor speed, line 806 represents speed of the first motor, and line 808 represents the speed of the second motor. As shown in FIG. 8A, the motor speed of the two motors initially drops to approximately 1,000 revolutions per minute before returning to approximately 5,000 revolutions. In that regard, the downhole tractor, after determining slippage of the second wheel, reduces the speed of both motors, thereby slowing the downhole tractor. In some embodiments, output values from creep feedback controllers of the downhole tractor (e.g, 228A and 228B of FIG. 2) dictate a temporary reduction of motor speed. FIG. 8B is a graph of the motor torque of the two motors over time, where axis 822 represents time, axis 824 represents motor torque, and lines 826 and 828 represent motor torque of the first motor and the second motor, respectively. As shown in FIG. 8B, lines 826 and 828 initially diverge from approximately time 20 seconds to approximately time 35 seconds, and converge from approximately time 35 seconds onwards, indicating that the motors are eventually configured to output approximately identical torque after an initial period (e.g., 35 seconds). In that regard, the downhole tractor, after determining slippage of the second wheel, reduces the torque of the second wheel. As shown in FIG. 8B, the torque of the first motor also initially spikes to approximately 1.2 Nm at time 20 seconds and drops back down to approximately 0.95 Nm after approximately time 22 seconds. In some embodiments, the downhole tractor, after determining that the torque of the first motor has temporarily increased above a threshold (e.g., 1.0 Nm), reduces the torque of the first motor to the threshold value or below the threshold value.

FIG. 8C is a graph of the DC bus current of the two motors over time, where axis 842 represents time, axis 844 represents current, and lines 846 and 848 represent the DC bus current of the first motor and the second motor, respectively. As shown in FIG. 8C, lines 846 and 848 also initially diverge from approximately time 20 seconds to approximately time 35 seconds, and converge from approximately time 35 seconds onwards, indicating an approximately identical amount of DC bus current is eventually provided to both motors after an initial period (e.g., 35 seconds). FIG. 8D is a graph of the speed of the downhole tractor, where axis 862 represents time, axis 864 represents tractor speed, and line 866 represents the speed of the downhole tractor. As shown in FIG. 8D, the speed of the downhole tractor temporarily slows down from approximately 0.25 meters per second to 0.06 meters per second. As the speed decreases, frictional force also decreases, and the downhole tractor is reconfigured to operate at a reduced speed condition. After the normal force on the second motors returns at time 25 seconds, the downhole tractor is further reconfigured to operate at the original condition. As such, the operations illustrated in FIG. 2 reduces the likelihood of slippage and stalling, thereby prolonging the operational expectancy of the downhole tractor.

Figure 9:
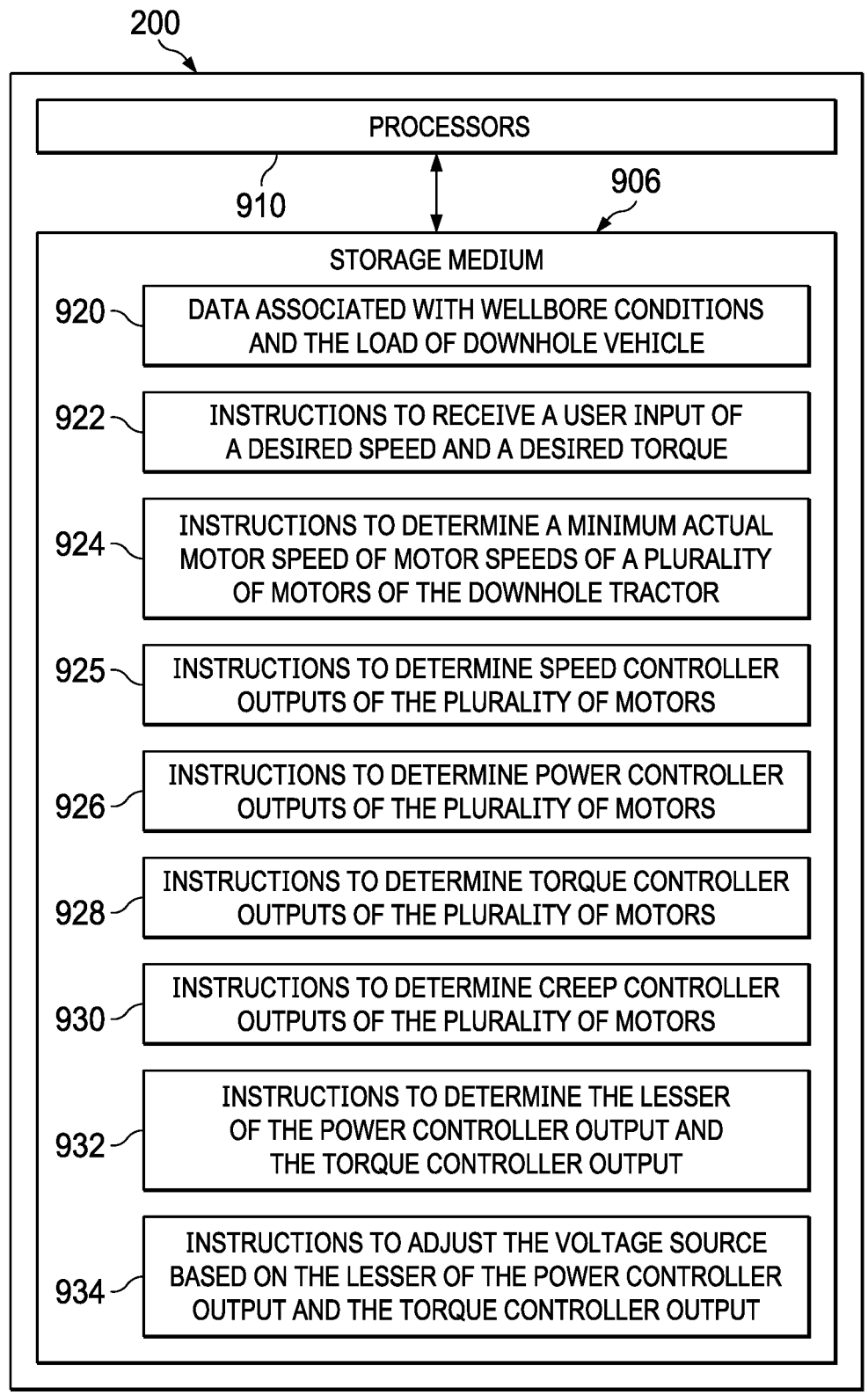
FIG. 9 illustrates a block diagram of the downhole tractor control system of FIG. 2.

FIG. 9 is a block diagram of downhole tractor control system 200 of FIG. 2. Downhole tractor control system 200 includes a storage medium 906 and processors 910. Storage medium 906 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 906 includes multiple data storage devices. In further embodiments, the multiple data storage devices may be physically stored at different locations. Data indicative of wellbore conditions, the load on the downhole tractor, as well as other data used to adjust motor output of the motors of the downhole tractor are stored at a first location 920 of storage medium 906.

As shown in FIG. 9, instructions to receive a user input of a desired speed and a desired torque are stored at a second location 922 of storage medium 906. Further, instructions to determine a minimum actual motor speed of motor speeds of a plurality of motors of the downhole tractor are stored at a third location 924 of the storage medium 906. Further, instructions to determine speed controller outputs of the plurality of motors are stored at a fourth location 925 of storage medium 906. Further, instructions to determine power controller outputs of the plurality of motors of the downhole tractor are stored at a fifth location 926 of storage medium 906. Further, instructions to determine torque controller outputs of the plurality of motors are stored at a sixth location 928 of storage medium 906. Further, instructions to determine creep controller outputs of the plurality of motors are stored at a seventh location 930 of storage medium 906. Further, instructions to determine a lesser of the power controller output and the torque controller output are stored at an eighth location 932 of storage medium 906. Further, instructions to adjust the voltage source invertor based on the lesser of the power controller output and the torque controller output are stored at a ninth location 936 of storage medium 906. The instructions to perform other operations described herein are also stored in storage medium 906.

In some embodiments, downhole tractor control system 200 is a component of downhole tractor 122 of FIG. 1. In some embodiments, downhole tractor control system 200 is a component of controller 184 of FIG. 1, or a component of another surface-based electronic device. In some embodiments, downhole tractor control system 200 is formed from controller 184 of FIG. 1, or from other surface-based electronic devices. In further embodiments, downhole tractor control system 200 is a component of a downhole tool that is deployed in wellbore 106 of FIG. 1. In further embodiments, parts of downhole tractor control system 200 are deployed on a surface-based electronic device, such as downhole tractor controller 184 of FIG. 1, and parts of downhole tractor control system 200 are deployed downhole.

In some embodiments, downhole tractor control system 200 contains additional components. For example, in some embodiments, downhole tractor control system 200 also includes wheels 123A-123D, or physical components of downhole tractor 122 of FIG. 1. In some embodiments, downhole tractor 122 is a component of downhole tractor control system 200. In some embodiments, downhole tractor control system 200 also includes telemetry systems described in FIG. 1, or other telemetry systems operable to transmit data between downhole tractor 122 and controller 184 of FIG. 1. In one or more of such embodiments, downhole tractor control system 200 also includes transmitters, receivers, transceivers, as well as other components used to transmit data between downhole tractor 122 and controller 184 of FIG. 1.

Figure 10:
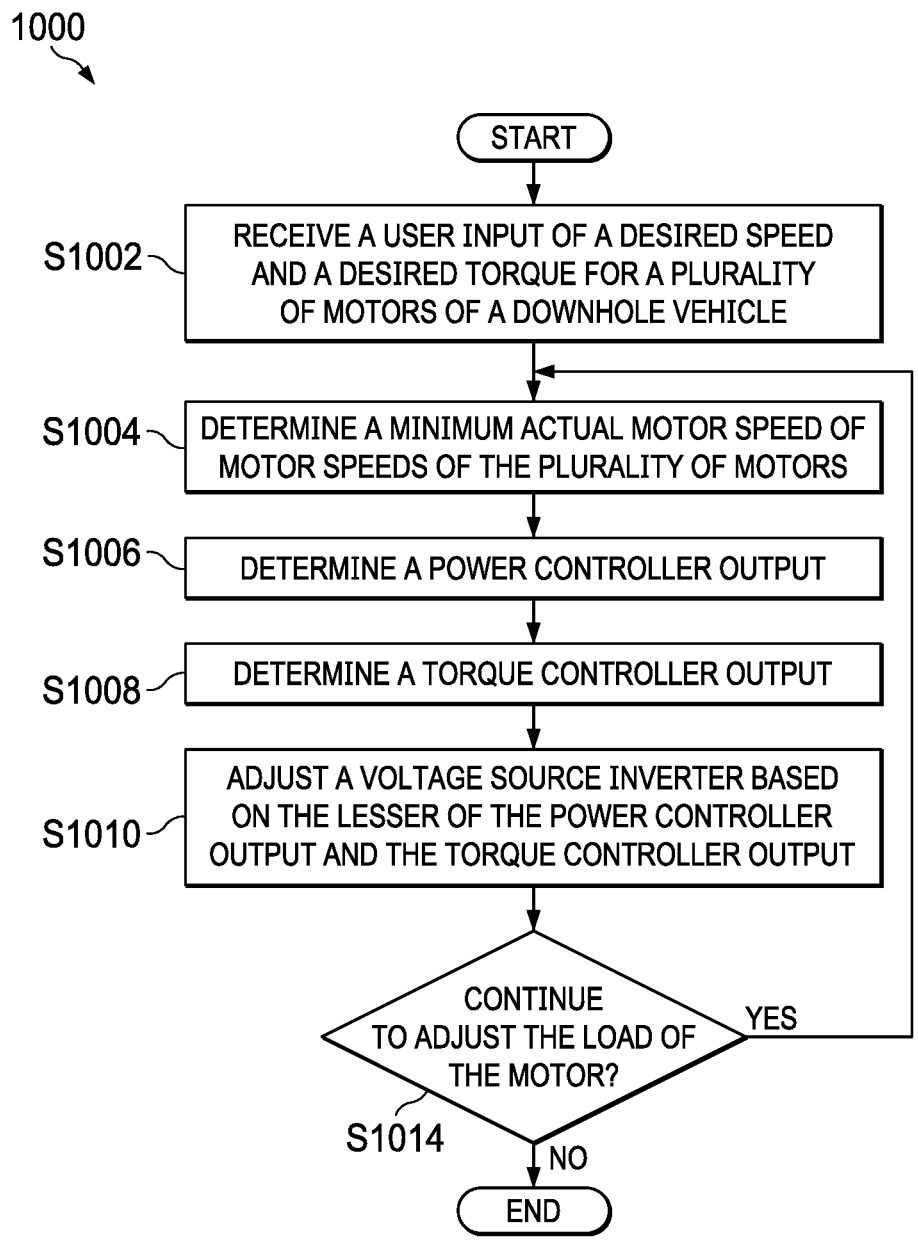
FIG. 10 illustrates a flow chart of a process to adjust a load of a downhole motor.

FIG. 10 is a flow chart of a process 1000 to adjust a load of a downhole motor. Although the operations in the process 1000 are shown in a particular sequence, certain operations may be performed in different sequences or at the same time where feasible. Further, although the operations in process 1000 are described to be performed by processors 910 of downhole tractor control system 200 of FIG. 9, the operations may also be performed by one or more processors of other electronic devices operable to perform operations described herein.

As described below, process 1000 provides an intuitive way for adjusting the load on a downhole tractor deployed during well operations and in well environments including in the environment of FIG. 1. The process dynamically adjusts motor outputs of different motors of the downhole tractor, thereby prolonging the life expectancy of the downhole tractor, and reducing the financial costs associated with the downhole tractor. The process also dynamically adjusts the outputs of the motors without operator assistance, thereby reducing the likelihood of operator-based errors.

At block S1002, the processors of a downhole tractor control system, such as processors 910 of FIG. 9, receive a user input of a desired speed and a desired torque of a plurality of motors of the downhole tractor. FIG. 2, for example, illustrates downhole tractor control system 200 obtaining user-desired speed, torque, relative creep, and absolute creep at blocks 202, 212, 221, and 222, respectively. At block S1004, the processors determine a minimum actual motor speed of motor speeds of the plurality of motors. FIG. 2, for example, illustrates downhole tractor control system 200 determining the minimum actual speed of motors 236A and 236B at block 248. In some embodiments, the processors determine a speed controller output of at least one motor of the plurality of motors. FIG. 2, for example, illustrates downhole tractor control system 200 performing operations at blocks 204A and 206A, to determine the speed controller output of motor 236A. At block S1006, the processors determine a power controller output. FIG. 2, for example, illustrates downhole tractor control system 200 performing operations at blocks 204A, 206A, 207A, and 208A to determine the power controller output of motor 236A. Similarly, downhole tractor control system 200 also performs operations at blocks 204B, 206B, 207B, and 208B to determine the power controller output of motor 236B.

At block S1008, the processors determine a torque controller output. FIG. 2, for example, illustrates downhole tractor control system 200 performing operations at blocks 214A and 216A to determine the torque controller output of motor 236A, and performing operations at blocks 214B and 216B to determine the torque controller output of motor 236B. In some embodiments, the processors also determine a creep controller output of the motor. FIG. 2, for example, illustrates downhole tractor control system 200 performing operations at blocks 224A, 226A, 227A, and 228A to determine the creep controller output of motor 236A, and performing operations at blocks 224B, 226B, 227B, and 228B to determine the creep controller output of motor 236B. The processors determine a lesser of the power controller output and the torque controller output. FIG. 2, for example, illustrates downhole tractor control system 200 determining the adjustment controller output of motors 236A and 236B at blocks 244A and 244B. FIG. 2 illustrates in an embodiment where downhole tractor control system 200 determines the adjustment controller output based on the minimum of the power controller output, torque controller output, and the creep controller output. In some embodiments, where downhole tractor control system 200 does not consider the creep associated with a motor, the adjustment controller output is the minimum of the power controller output and the torque controller output.

At block S1010, the processors adjust the voltage source invertor based on the lesser of the power controller output and the torque controller output to modulate voltage provided to the at least one motor. FIG. 2, for example, illustrates downhole tractor control system 200 performing a pulse width modulation of signals indicative of the controller adjustment output at blocks 246A and 246B (which are the lesser value of the power controller output, torque controller output, and the creep controller output, and in embodiments where the creep is not considered, the lesser of the power controller output and torque controller output) to obtain gate signals for controlling VSI controllers 234A and 234B. Adjustments made to VSI controllers 234A and 234B based on the gate signals in turn adjust the motor outputs of motors 236A and 236B. At block S1014, the processors determine whether to continue to adjust the load. The process proceeds to block S1004 if the processors determine to adjust the output of the motor of the downhole tractor, and the operations performed at blocks S1004, S1006, S1008, and S1010 are repeated. Alternatively, the process ends if the processors determine not to adjust the output of the motor of the downhole tractor. Although FIG. 10 illustrates a process for performing operations one motor at a time, in some embodiments, the processors simultaneously perform processes at blocks S1002, S1004, S1006, S1008, and S1010 for multiple motors.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a method to adjust a load of a downhole motor, the method comprising: receiving a user input of a desired speed and torque for a plurality of motors powering rotation of wheels of a downhole tractor; determining a minimum actual motor speed of the plurality of motors; for at least one of the plurality of motors: determining a power controller output based on the desired speed to control voltage of the at least one motor; determining a torque controller output based on the desired torque to control voltage of the at least one motor; and adjusting a voltage source invertor based on a lesser of the power controller output and the torque controller output to modulate voltage provided to the at least one motor.

Clause 2, the method of clause 1, further comprising: receiving a user input of a relative creep and an absolute creep for the plurality of motors; and determining a creep controller output based on the relative creep and the absolute creep to control voltage of the at least one motor, and wherein the voltage source invertor is adjusted based on the lesser of the power controller output, the torque controller output, and the creep controller output.

Clause 3, the method of clause 2, wherein determining the power controller output comprises: determining a speed error based on the desired speed and the minimum actual motor speed; determining a power reference of the at least one motor based on the speed error; and determining an error between the power reference and a feedback of power provided to the at least one motor, wherein the power controller output is based on the error between the power reference and the feedback of the power.

Clause 4, the method of clause 3, wherein determining the power reference comprises utilizing a first proportional-integral controller to determine the power reference based on the speed error, and wherein determining the power controller output comprises utilizing a second proportional-integral controller to determine the power controller output based on the error between the power reference and feedback of the power.

Clause 5, the method of clause 3, wherein determining the power reference comprises utilizing a first proportional-integral-derivative controller to determine the power reference based on the speed error, and wherein determining the power controller output comprises utilizing a second proportional-integral-derivative controller to determine the power controller output based on the error between the power reference and the feedback of the power.

Clause 6, the method of any of clauses 2-5, wherein determining the torque controller output comprises: determining a torque error based on the desired torque and a feedback torque of the at least one motor; and determining the torque controller output based on the torque error.

Clause 7, the method of any of clauses 2-6, wherein determining the creep controller output comprises: determining a relative creep reference based on the relative creep and the minimum actual motor speed; determining an absolute creep reference based on the absolute creep and the relative creep reference; determining a creep error based on the absolute creep reference and a feedback speed of the at least one motor; and determining the creep controller output based on the creep error.

Clause 8, the method of any of clauses 2-7, wherein the relative creep is a percentage value, and wherein the absolute creep is an integer value.

Clause 9, the method of any of clauses 1-8, further comprising performing a pulse width modulation of the lesser of the power controller output and the torque controller output.

Clause 10, the method of any of clauses 1-9, further comprising: determining a torque of the downhole tractor; and in response to determining the torque of the downhole tractor is greater than a threshold value, reducing torque of the plurality of motors to the threshold value.

Clause 11, a downhole tractor control system, comprising: a storage medium; and one or more processors operable to: receive a user input of a desired speed, torque, relative creep, and absolute creep for a plurality of motors, the plurality of motors powering rotation of wheels of the downhole tractor; determine a minimum actual motor speed of the plurality of motors; for at least one motor of the plurality of motors: determine a power controller output based on the desired speed to control voltage of the at least one motor; determine a torque controller output based on the desired torque to control voltage of the at least one motor; determine a creep controller output to control voltage of the at least one motor; and adjust a voltage source invertor based on a lesser value of the power controller output, the torque controller output, and the creep controller output.

Clause 12, downhole tractor control system of clause 11, wherein the one or more processors are further operable to: determine a speed error based on the desired speed and the minimum actual motor speed; determine a power reference of the at least one motor based on the speed error, and wherein the power reference is a desired input power of the at least one motor; and determine an error between the power reference and a feedback of power provided to the at least one motor, wherein the power controller output is based on the error between the power reference and the feedback of the power.

Clause 13, the downhole tractor control system of clause 12, further comprising: a first proportional-integral controller operable to determine the power reference based on the speed error; and a second proportional-integral controller operable to determine the power controller output based on the error between the power reference and the feedback of the power.

Clause 14, the downhole tractor control system of any of clauses 11-13, wherein the one or more processors are further operable to: determine a torque error based on a desired torque and a feedback torque of the at least one motor; and determine the torque controller output based on the torque error.

Clause 15, the downhole tractor control system of any of clauses 11-14, wherein the one or more processors are further operable to: determine a relative creep reference based on the relative creep and the minimum actual motor speed; determine an absolute creep reference based on the absolute creep and the relative creep reference; determine a creep error based on the absolute creep reference and a feedback speed of the at least one motor; and determine the creep controller output based on the creep error.

Clause 16, the downhole tractor control system of any of clauses 11-15, wherein the relative creep is a percentage value, and wherein the absolute creep is an integer value.

Clause 17, the downhole tractor control system of any of clauses 11-16, wherein the one or more processors are further operable to perform a pulse width modulation of the lesser value of the power controller output, the torque controller output, and the creep controller output.

Clause 18, a non-transitory machine-readable medium comprising instructions stored therein, which when executed by one or more processors, cause the one or more processors to perform operations comprising: receiving a user input of a desired speed, torque, relative creep, and absolute creep for a motor that powers rotation of a wheel of a downhole tractor; determining an actual speed of the motor; determining a power controller output of the motor based on the desired speed to control voltage of the at least one motor; determining a torque controller output of the motor based on the desired torque to control voltage of the motor; determining a creep controller output of the motor based on the relative creep and the absolute creep to control voltage of the motor; and adjusting a voltage source invertor based on a lesser of the power controller output and the torque controller output to modulate voltage provided to the motor.

Clause 19, the non-transitory machine-readable medium of clause 18, wherein the instructions when executed by one or more processors, cause the one or more processors to perform operations comprising: determining a speed error based on the desired speed and the actual speed; determining a power reference of the motor based on the speed error, and wherein the power reference is a desired input power of the motor; determining an error between the power reference and a feedback of power provided to the motor, wherein the power controller output is based on the error between the power reference and the feedback of power; determining a torque error based on a desired torque reference of the desired torque and a feedback torque of the motor; determining the torque controller output based on the torque error; determining a relative creep reference based on the relative creep and the actual speed; determining an absolute creep reference based on the absolute creep and the relative creep reference; determining a creep error based on the absolute creep reference and a feedback speed of the motor; and determining the creep controller output based on the creep error.

Clause 20, the non-transitory machine-readable medium of clauses 18 or 19, wherein the instructions when executed by one or more processors, cause the one or more processors to perform operations comprising performing a pulse width modulation of the lesser value of the power controller output, the torque controller output, and the creep controller output.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an," and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

What is claimed is:

1. A method to adjust a load of a downhole motor, the method comprising:
   receiving a user input of a desired speed and torque for a plurality of motors powering rotation of wheels of a downhole tractor;
   determining a minimum actual motor speed of the plurality of motors;
   for at least one of the plurality of motors:
   determining a speed error based on the desired speed and the minimum actual motor speed;
   determining a power reference of the at least one motor based on the speed error; and
   determining an error between the power reference and a feedback of power provided to the at least one motor,
   determining a power controller output based on the desired speed to control voltage of the at least one motor and the error between the power reference and the feedback of the power;
   determining a torque error based on the desired torque and a feedback torque of the at least one motor;
   determining a torque controller output based on the desired torque to control voltage of the at least one motor and the torque error; and
   adjusting a voltage source invertor based on a lesser of the power controller output and the torque controller output to modulate voltage provided to the at least one motor.

2. The method of claim 1, further comprising:
   receiving a user input of a relative creep and an absolute creep for the plurality of motors; and
   determining a creep controller output based on the relative creep and the absolute creep to control voltage of the at least one motor, wherein the voltage source invertor is adjusted based on the lesser of the power controller output, the torque controller output, and the creep controller output.

3. The method of claim 2, wherein determining the power reference comprises utilizing a first proportional-integral controller to determine the power reference based on the speed error, and wherein determining the power controller output comprises utilizing a second proportional-integral controller to determine the power controller output based on the error between the power reference and the feedback of the power.

4. The method of claim 2, wherein determining the power reference comprises utilizing a first proportional-integral-derivative controller to determine the power reference based on the speed error, and wherein determining the power controller output comprises utilizing a second proportional-integral-derivative controller to determine the power controller output based on the error between the power reference and the feedback of the power.

5. The method of claim 2, wherein determining the creep controller output comprises:
   determining a relative creep reference based on the relative creep and the minimum actual motor speed;
   determining an absolute creep reference based on the absolute creep and the relative creep reference;
   determining a creep error based on the absolute creep reference and a feedback speed of the at least one motor; and
   determining the creep controller output based on the creep error.

6. The method of claim 2, wherein the relative creep is a percentage value, and wherein the absolute creep is an integer value.

7. The method of claim 1, further comprising performing a pulse width modulation of the lesser of the power controller output and the torque controller output.

8. The method of claim 1, further comprising:
   determining a torque of the downhole tractor; and
   in response to determining the torque of the downhole tractor is greater than a threshold value, reducing torque of the plurality of motors to the threshold value.

9. A downhole tractor control system, comprising:
   a storage medium; and
   one or more processors operable to:
   receive a user input of a desired speed and a desired torque for a plurality of motors, the plurality of motors powering rotation of wheels of the downhole tractor;
   determine a minimum actual motor speed of the plurality of motors;
   for at least one motor of the plurality of motors:
   determine a speed error based on the desired speed and the minimum actual motor speed;
   determine a power reference of the at least one motor based on the speed error; and
   determine an error between the power reference and a feedback of power provided to the at least one motor,
   determine a power controller output based on the desired speed to control voltage of the at least one motor and the error between the power reference and the feedback of the power;

determine a torque error based on the desired torque and a feedback torque of the at least one motor;

determine a torque controller output based on the desired torque to control voltage of the at least one motor and the torque error; and adjust a voltage source invertor based on a lesser value of the power controller output and the torque controller output.

10. The downhole tractor control system of claim 9, wherein the one or more processors are further operable to receive a user input of a relative creep and an absolute creep for the plurality of motors; and determine a creep controller output based on the relative creep and the absolute creep to control voltage of the at least one motor, wherein the voltage source invertor is adjusted based on the lesser of the power controller output, the torque controller output, and the creep controller output.

11. The downhole tractor control system of claim 10, further comprising:

a first proportional-integral controller operable to determine the power reference based on the speed error; and a second proportional-integral controller operable to determine the power controller output based on the error between the power reference and the feedback of the power.

12. The downhole tractor control system of claim 10, wherein the one or more processors are further operable to:

determine a relative creep reference based on the relative creep and the minimum actual motor speed;

determine an absolute creep reference based on the absolute creep and the relative creep reference;

determine a creep error based on the absolute creep reference and a feedback speed of the at least one motor; and determine the creep controller output based on the creep error.

13. The downhole tractor control system of claim 10, wherein the relative creep is a percentage value, and wherein the absolute creep is an integer value.

14. The downhole tractor control system of claim 10, wherein the one or more processors are further operable to perform a pulse width modulation of the lesser value of the power controller output, the torque controller output, and the creep controller output.

15. A non-transitory machine-readable medium comprising instructions stored therein, which when executed by one or more processors, cause the one or more processors to perform operations comprising:

receiving a user input of a desired speed and a desired torque for a motor that powers rotation of a wheel of a downhole tractor;

determining an actual speed of the motor;

determining a speed error based on the desired speed and the actual speed;

determining a power reference of the motor based on the speed error;

determining an error between the power reference and a feedback of power provided to the motor, determining a power controller output based on the desired speed to control voltage of the at least one motor and the error between the power reference and the feedback of power;

determining a torque error based on the desired torque and a feedback torque of the at least one motor;

determining a torque controller output of the motor based on the desired torque to control voltage of the motor and the torque error; and adjusting a voltage source invertor based on a lesser of the power controller output and the torque controller output to modulate voltage provided to the motor.

16. The non-transitory machine-readable medium of claim 15, wherein the instructions when executed by one or more processors, cause the one or more processors to perform operations comprising:

determining a torque error based on a desired torque reference of the desired torque and a feedback torque of the motor; and determining the torque controller output based on the torque error.

17. The non-transitory machine-readable medium of claim 15, wherein the instructions when executed by one or more processors, cause the one or more processors to perform operations comprising:

receiving a user input of a relative creep and an absolute creep for the plurality of motors; and determining a creep controller output based on the relative creep and the absolute creep to control voltage of the at least one motor, wherein the voltage source invertor is adjusted based on the lesser of the power controller output, the torque controller output, and the creep controller output.

18. The non-transitory machine-readable medium of claim 17, wherein the instructions when executed by one or more processors, cause the one or more processors to perform operations comprising performing a pulse width modulation of the lesser value of the power controller output, the torque controller output, and the creep controller output.

* * * * *